United States Patent
Gardner et al.

(10) Patent No.: US 11,966,774 B2
(45) Date of Patent: Apr. 23, 2024

(54) WORKFLOW GENERATION USING MULTIPLE INTERFACES

(71) Applicant: MicroStrategy Incorporated, Vienna, VA (US)

(72) Inventors: Richard Gardner, Leesburg, VA (US); Clayton Myers, Oak Hill, VA (US); Andrew Smith, Oakton, VA (US)

(73) Assignee: MicroStrategy Incorporated, Vienna, VA (US)

( * ) Notice: Subject to any disclaimer, the term of this patent is extended or adjusted under 35 U.S.C. 154(b) by 157 days.

(21) Appl. No.: 17/078,394

(22) Filed: Oct. 23, 2020

(65) Prior Publication Data

US 2021/0124610 A1 Apr. 29, 2021

Related U.S. Application Data

(60) Provisional application No. 62/925,967, filed on Oct. 25, 2019.

(51) Int. Cl.
  *G06F 9/48* (2006.01)
  *G06F 8/61* (2018.01)
  *G06F 9/451* (2018.01)
  *G06F 9/54* (2006.01)

(52) U.S. Cl.
  CPC ............ *G06F 9/4881* (2013.01); *G06F 8/63* (2013.01); *G06F 9/451* (2018.02); *G06F 9/541* (2013.01)

(58) Field of Classification Search
  CPC .......... G06F 9/4881; G06F 8/63; G06F 9/451; G06F 9/541
  See application file for complete search history.

(56) References Cited

U.S. PATENT DOCUMENTS

| | | |
|---|---|---|
| 6,816,871 B2 | 11/2004 | Lee |
| 6,964,051 B1 | 11/2005 | Palaniappan |
| 7,552,438 B1 | 6/2009 | Werme et al. |

(Continued)

OTHER PUBLICATIONS

Ancillaryinsights[ online], "MicroStrategy Analytics Enterprise—Upgrade Guide," 2013, retrieved on Sep. 29, 2021, retrieved from URL <http://ancillaryinsights.com/producthelp/AnalyticsEnterprise/manuals/en/UpgradeGuide.pdf>, 122 pages.

(Continued)

*Primary Examiner* — Kevin L Young
*Assistant Examiner* — Phuong N Hoang
(74) *Attorney, Agent, or Firm* — Fish & Richardson P.C.

(57) ABSTRACT

Methods, systems, and apparatus, including computer programs encoded on computer-readable media, for workflow generation using multiple interfaces. In some implementations, an interface for defining a workflow having one or more operations for a computer system to perform is provided. The interface can provide options that are selectable to cause an operation from a predetermined set of operations to be added to the workflow. Data indicating user selection of an option of the interface corresponding to a first operation in the predetermined set of operations is received. Code that specifies one or more custom operations is received. The workflow is defined to include (i) the first operation based on the data indicating the user selection and (ii) a second operation specified by the code.

20 Claims, 7 Drawing Sheets

(56) References Cited

U.S. PATENT DOCUMENTS

| | | |
|---|---|---|
| 7,581,011 B2 | 8/2009 | Teng |
| 7,802,174 B2 | 9/2010 | Teng et al. |
| 7,937,655 B2 | 5/2011 | Teng et al. |
| 9,166,895 B1 | 10/2015 | Sivaraman |
| 9,311,161 B2 | 4/2016 | Jagtap |
| 9,436,535 B2 | 9/2016 | Ricken et al. |
| 9,762,450 B2 | 9/2017 | Xie |
| 9,811,849 B2 | 11/2017 | Bursey |
| 10,803,411 B1 | 10/2020 | Smith et al. |
| 10,810,041 B1 | 10/2020 | Myers et al. |
| 10,997,135 B2 | 5/2021 | Zoll et al. |
| 11,025,707 B1 | 6/2021 | Luker |
| 11,102,330 B2 | 8/2021 | Gardner et al. |
| 11,263,111 B2 | 3/2022 | Lang et al. |
| 11,354,216 B2 | 6/2022 | Gardner et al. |
| 11,409,644 B2 | 8/2022 | Carames et al. |
| 2003/0135382 A1 | 7/2003 | Marejka et al. |
| 2003/0220707 A1* | 11/2003 | Budinger ......... G05B 19/41885 715/965 |
| 2004/0060044 A1 | 3/2004 | Das et al. |
| 2004/0068424 A1 | 4/2004 | Lee et al. |
| 2007/0038931 A1 | 2/2007 | Allaire et al. |
| 2007/0226680 A1 | 9/2007 | Kumhyr et al. |
| 2008/0115195 A1 | 5/2008 | Malek et al. |
| 2008/0243902 A1* | 10/2008 | Rong ..................... G06Q 10/06 707/999.102 |
| 2009/0044185 A1* | 2/2009 | Krivopaltsev ...... H04L 41/0806 717/173 |
| 2009/0063699 A1 | 3/2009 | Chapweske et al. |
| 2010/0162406 A1 | 6/2010 | Benameur et al. |
| 2010/0250487 A1 | 9/2010 | Gabriel et al. |
| 2010/0318986 A1 | 12/2010 | Burke et al. |
| 2011/0055823 A1 | 3/2011 | Nichols et al. |
| 2012/0054095 A1 | 3/2012 | Lesandro et al. |
| 2012/0124197 A1 | 5/2012 | Ghai et al. |
| 2012/0198279 A1 | 8/2012 | Schroeder |
| 2012/0290950 A1 | 11/2012 | Rapaport et al. |
| 2014/0331209 A1 | 11/2014 | Singh |
| 2015/0067687 A1* | 3/2015 | Turner .................. G06F 3/0484 718/102 |
| 2015/0081574 A1 | 3/2015 | Selby et al. |
| 2015/0089479 A1 | 3/2015 | Chen et al. |
| 2015/0100829 A1 | 4/2015 | Nanjundappa et al. |
| 2015/0178052 A1 | 6/2015 | Gupta et al. |
| 2015/0220426 A1 | 8/2015 | Spektor et al. |
| 2015/0242636 A1 | 8/2015 | Khan et al. |
| 2015/0287101 A1 | 10/2015 | Baldwin et al. |
| 2015/0370540 A1* | 12/2015 | Coslovi ..................... G06F 8/20 717/121 |
| 2016/0026555 A1 | 1/2016 | Kuo et al. |
| 2016/0072683 A1* | 3/2016 | Xie ..................... H04L 41/0843 709/220 |
| 2016/0292599 A1 | 10/2016 | Andrews et al. |
| 2016/0294614 A1 | 10/2016 | Searle et al. |
| 2016/0371170 A1 | 12/2016 | Salunke et al. |
| 2016/0371622 A1 | 12/2016 | Kurian et al. |
| 2017/0034023 A1 | 2/2017 | Nickolov et al. |
| 2017/0161105 A1 | 6/2017 | Barrett et al. |
| 2017/0315714 A1 | 11/2017 | Shyamsundar |
| 2017/0315981 A1 | 11/2017 | Shrestha et al. |
| 2017/0329506 A1* | 11/2017 | Laetham ..................... G06F 8/31 |
| 2017/0372442 A1 | 12/2017 | Mejias |
| 2018/0075202 A1 | 3/2018 | Davis et al. |
| 2018/0083995 A1 | 3/2018 | Sheth et al. |
| 2018/0114126 A1 | 4/2018 | Das et al. |
| 2018/0267908 A1 | 9/2018 | Pan et al. |
| 2018/0287902 A1 | 10/2018 | Chitalia et al. |
| 2018/0330293 A1 | 11/2018 | Kulkarni et al. |
| 2019/0042900 A1 | 2/2019 | Smith et al. |
| 2019/0050229 A1* | 2/2019 | Chovel ................. G06F 40/194 |
| 2019/0109822 A1 | 4/2019 | Clark et al. |
| 2019/0213068 A1 | 7/2019 | Upadhyay |
| 2019/0317829 A1 | 10/2019 | Brown et al. |
| 2020/0019393 A1 | 1/2020 | Vichare et al. |
| 2020/0034491 A1* | 1/2020 | Sangodkar ............ G06F 9/3005 |
| 2020/0119979 A1 | 4/2020 | Woodland et al. |
| 2020/0204465 A1 | 6/2020 | Baker et al. |
| 2020/0250897 A1* | 8/2020 | Wei .......................... G07C 3/08 |
| 2020/0257612 A1 | 8/2020 | Lang et al. |
| 2020/0293436 A1 | 9/2020 | Carames et al. |
| 2020/0366572 A1 | 11/2020 | Chauhan |
| 2021/0064492 A1 | 3/2021 | Myers |
| 2021/0065078 A1 | 3/2021 | Gardner et al. |
| 2021/0067607 A1 | 3/2021 | Gardner et al. |
| 2021/0073026 A1 | 3/2021 | Myers et al. |
| 2021/0081298 A1 | 3/2021 | Gardner et al. |
| 2021/0117243 A1 | 4/2021 | Ghafourifar |

OTHER PUBLICATIONS

Bedford-computing [online], "JMeter Tutorial," retrieved on Sep. 29, 2021, retrieved from URL < http://bedford-computing.co.uk/learning/wp-content/uploads/2016/03/JMeter-Tutorial.pdf >, 53 pages.

HP [online], "An Introduction to HP LoadRunner software" May 2011, retrieved on Sep. 29, 2021, retrieved from URL <https://www.hp.com/sg-en/pdf/LR_technical_WP_tcm_196_1006601.pdf>, 8 pages.

Jaspersoft [online], "Performance Testing with Jmeter," 2012, retrieved on Sep. 29, 2021, retrieved from URL <https://community.jaspersoft.com/wiki/performance-testing-jmeter >, 4 pages.

Microfocus [online], "LoadRunner and Performance Center," Feb. 2018, retrieved on Sep. 29, 2021, retrieved from URL < https://www.microfocus.com/media/documentation/loadrunner_and_performance_center_document.pdf >, 249 pages.

MicroStrategy [online], " KB16749: What is MicroStrategy Integrity Manager?", 2019, retrieved on Sep. 29, 2021, retrieved from URL <https://community.microstrategy.com/s/article/KB16749-What-is-MicroStrategy-Integrity-Manager?language=en_US >, 2 pages.

MicroStrategy [online], "Configuring an upgrade test environment," 2019, retrieved on Sep. 29, 2021, retrieved from URL < https://doc-archives.microstrategy.com/producthelp/11.0/UpgradeGuide/WebHelp/Lang_1033/Content/configuring_an_upgrade_test_environment.htm >, 2 pages.

MicroStrategy [online], "High-level steps to configure an upgrade test environment," 2019, retrieved on Sep. 29, 2021, retrieved from URL < https://doc-archives.microstrategy.com/producthelp/11.0/UpgradeGuide/WebHelp/Lang_1033/content/high_level_steps_to_configure_an_upgrade_test_envi.htm >, 2 pages.

MicroStrategy [online], "Integrity Manager—Upgrade Impact Testing," 2019, retrieved on Sep. 29, 2021, retrieved from URL < https://www2.microstrategy.com/producthelp/2019/UpgradeGuide/en-us/Content/Integrity_testing.htm >, 2 pages.

MicroStrategy [online], "Integrity Manager Homepage," 2019, retrieved on Sep. 29, 2021, retrieved from URL < https://community.microstrategy.com/s/article/Integrity-Manager-Homepage?language=en_US >, 2 pages.

MicroStrategy [online], "MicroStrategy Capacity Testing Tool," 2019, retrieved on Sep. 29, 2021, retrieved from URL< https://www2.microstrategy.com/producthelp/2019/UpgradeGuide/en-us/Content/capacity_testing.htm >, 2 pages.

MicroStrategy [online], "MicroStrategy Integrity Manager" 2017, retrieved on Sep. 29, 2021, retrieved from URL < https://doc-archives.microstrategy.com/producthelp/10.4/ProjectDesignGuide/WebHelp/Lang_1033/Content/ProjectDesign/MicroStrategy_Integrity_Manager.htm >, 2 pages.

MicroStrategy [online], "MicroStrategy Upgrade Best Practices" Aug. 2019, retrieved on Sep. 29, 2021, retrieved from URL < https://community.microstrategy.com/s/article/MicroStrategy-Upgrade-Best-Practices?language=en_US >, 2 pages.

MicroStrategy [online], "Perform Basic Stability Testing," 2019, retrieved on Sep. 29, 2021, retrieved from URL < https://doc-archives.microstrategy.com/producthelp/11.0/UpgradeGuide/WebHelp/Lang_1033/Content/perform_basic_stability_testing_on_the_test_server.htm >, 2 pages.

MicroStrategy [online], "The Upgrade Process Checklist," 2019, retrieved on Sep. 29, 2021, retrieved from URL <https://doc-archives.microstrategy.com/producthelp/11.0/UpgradeGuide/WebHelp/Lang_1033/Content/the_upgrade_process_checklist.htm >, 3 pages.

(56) References Cited

OTHER PUBLICATIONS

MicroStrategy [online], "Upgrade Analysis Dossier," 2020, retrieved on Sep. 29, 2021, retrieved from URL < https://community.microstrategy.com/s/article/Upgrade-Analysis-Dossier?language=en_US >, 2 pages.

MicroStrategy [online], "Upgrade Guide—Upgrading your MicroStrategy Enterprise Software," 2016, retrieved on Sep. 29, 2021, retrieved from URL < https://doc-archives.microstrategy.com/producthelp/10.4/manuals/en/UpgradeGuide.pdf>, 109 pages.

Tutorialspoint [online], "JMETER—Quick Guide," 2007, retrieved on Sep. 29, 2021, retrieved from URL <https://www.tutorialspoint.com/jmeter/pdf/jmeter_quick_guide.pdf >, 49 pages.

U.S. Office Action in U.S. Appl. No. 16/815,788, dated Sep. 7, 2021, 27 pages.

U.S. Office Action in U.S. Appl. No. 17/024,050, dated Aug. 19, 2021, 13 pages.

Notice of Allowance in U.S. Appl. No. 16/815,788, dated Mar. 31, 2022, 17 pages.

U.S. Office Action in U.S. Appl. No. 16/557,482, dated Nov. 30, 2020, 13 pages.

U.S. Office Action in U.S. Appl. No. 16/787,596 dated Nov. 25, 2020, 11 pages.

U.S. Office Action in U.S. Appl. No. 17/013,005, dated Nov. 24, 2021, 18 pages.

U.S. Office Action in U.S. Appl. No. 17/024,050, dated Feb. 1, 2022, 6 pages.

U.S. Office Action in U.S. Appl. No. 16/787,596, dated Nov. 1, 2021, 10 pages.

MicroStrategy [online], "Upgrade Guide—Upgrading your MicroStrategy Enterprise Software," Jun. 2016, retrieved on Oct. 8, 2021, retrieved from URL <https://doc-archives.microstrategy.com/producthelp/10.4/manuals/en/UpgradeGuide.pdf>, 109 pages.

U.S. Office Action in U.S. Appl. No. 17/005,640, dated Dec. 22, 2021, 26 pages.

Office Action in U.S. Appl. No. 17/005,640, dated Jul. 20, 2022, 18 pages.

Office Action in U.S. Appl. No. 17/013,005, dated Jul. 21, 2022, 19 pages.

Xu et al., "Modelling and analysis techniques for cross-organizational workflow systems," Systems Research and Behavioral Science, Mar. 2009, 26(3):367-389.

Office Action in U.S. Appl. No. 17/013,005, dated Jan. 24, 2023, 26 pages.

Office Action in U.S. Appl. No. 17/005,640, dated Jun. 8, 2023, 16 pages.

Office Action in U.S. Appl. No. 17/013,005, dated May 2, 2023, 26 pages.

Office Action in U.S. Appl. No. 17/013,005, dated Oct. 12, 2023, 29 pages.

* cited by examiner

Workflow Library 1

| Name | Purpose | Description | Security Permissions | Compatible Versions |
|---|---|---|---|---|
| Patching (Workflow 1) | Upgrade Software and/or Fix Known Software Errors | Check SW Version; Compare SW Version with a Current SW Version; Download a Patch if No Match; and Install the Patch if No Match | Full Control; and Modify | Versions 2.09 & Higher |
| Update Cache (Workflow 2) | Store New Data and/or Remove Old Data | Open Cache; Identify Data in the Cache; and Store New Data in the Cache and/or Remove Old Data from the Cache | Full Control; Modify; and Read & Execute | Versions 1.10 & Higher |
| ... | ... | ... | ... | ... |
| Import Data Source (Workflow 5) | Import New Data from a Source into a Destination | Open Source; Identify Data to Import; Determine the Destination; and Initiate Import of Identified Data from the Source to the Destination | Full Control; Modify; Read & Execute; and Write | Versions 1.10 & Higher |

FIG. 2

WORKFLOW GENERATION USING MULTIPLE INTERFACES

CROSS-REFERENCE TO RELATED APPLICATION

This application claims the benefit of U.S. Provisional Patent Application No. 62/925,967, filed on Oct. 25, 2019, the entire contents of which is incorporated by reference herein.

BACKGROUND

Servers and other computers experience a wide variety of conditions. Many computer systems require periodic or ongoing maintenance to ensure proper operation and to deal with errors and limitations.

SUMMARY

In some implementations, a computer system can provide an interface that allows computing workflows to be defined in flexible and dynamic ways. The interface can be configured so a user can define characteristics of a workflow through text, manipulation of graphical user interface (GUI) elements (e.g., drag-and-drop, interacting with on-screen controls, etc.), and other techniques. The interface can enable a user to specify the operations of a workflow using different techniques. For example, the interface can provide selectable elements to add predetermined operation, an area to receive programming code (e.g., so a user can define custom operations), controls to record and incorporate user actions taken at a client device, functionality to insert references to external systems (e.g., through application programming interfaces (APIs), remote procedure calls, etc.), and functionality to run different software modules (e.g., applications, services, containers, etc.). Any or all of these different techniques for specifying and editing workflow content can be used to create a customized, hybrid workflow that represents the combination of predetermined elements with custom elements. The workflow can then be saved in a redistributable package so it can be deployed for use by one or more computer systems.

In some implementations, the workflow creation interface provides predefined workflow elements that correspond to different operations. The element can be selectable to add the corresponding operations into a workflow. The elements included in the interface may represent one or more actions or operations that a workflow can perform when run. The elements may additionally include conditions that can be attached to an action or operations, or to the workflow itself. For example, through this interface, a user may select an element that adds a condition to the workflow in order for the workflow to be run. As another example, a user may select an element corresponding to an action or operation and then a second element corresponding to a condition.

In some implementations, the workflow creation interface can include a development environment region where one or more users may enter programming code. For example, the development environment region can receive a script or executable code. The system may integrate this code into the workflow as a workflow element, as a condition to an existing workflow element, or as a condition to the workflow itself.

In some implementations, the workflow creation interface enables a user to record a sequence of user-initiated actions and convert the sequence into workflow elements. For example, when a user indicates that actions should be recorded, the system may start recording actions taken by the user, e.g., setting changes made to the system, system processes initiated by the one or more users on the system, etc. This action sequence may be ended when the system receives a stop input from the user or after the system determines that a predetermined amount of time has allotted since the action sequence was started. The system can generate one or more workflow elements that will recreate the actions in the recorded sequence. The system can automatically integrate these workflow elements into the workflow. For example, the system may add generated workflow elements into the workflow after any preexisting elements, e.g., appending the operations to the workflow.

In some implementations, the workflow creation interface enables workflow operations access to resources external with respect to the system. Specifically, this interface may provide for the addition of one or more application programming interfaces (APIs) to the workflow. The APIs may allow the workflow, e.g., through the system, to access one or more external servers, databases, repositories, or systems when the workflow is run. When an element is added that requires a particular API, the system may automatically add the API to the workflow and associate it with the particular element. Alternatively, when an element is added that requires a particular API, the system can generate a recommendation that the API be added to the workflow, and notify the user of the recommendation. The system may proceed to automatically associate the API with the element.

In some implementations, the workflow creation interface can add container functions, such as starting, loading, or ending a container, to the workflow. For example, through this interface, a user may select a software image. The system may generate a corresponding workflow element and automatically add it to the workflow. The workflow element may provide that the software image is to be loaded and that an instance of the software image should be run, thereby producing a container. As another example, through this interface, a user may select one or more actions that can be taken with containers, e.g., can select an action to end all running containers, to reload a software image of a container, to change the configuration settings of a container, to change the data accessible to a container, etc.

The system can enable a user to create, install, and run a workflow that was generated using multiple different techniques. The workflow may be able to run on one computer system and perform operations that involve with one or more other external systems, for example, over a network such as the Internet. The external systems may include repositories, other databases, analytics systems, etc. The workflow may be able to perform operations involving external systems by making requests according to one or more APIs, and the workflow creation interface can add operations for making the requests and using the results to the workflow.

In one general aspect, a method includes: providing, by the one or more computers, an interface for defining a workflow having one or more operations for a computer system to perform, the interface providing options that are selectable to cause an operation from a predetermined set of operations to be added to the workflow; receiving data indicating user selection of an option of the interface corresponding to a first operation in the predetermined set of operations; receiving, through the interface, code that specifies one or more custom operations; and defining the workflow to include (i) the first operation based on the data indicating the user selection and (ii) a second operation specified by the code.

Implementations may include one or more of the following features. For example, in some implementations, the interface for defining the workflow is a graphical user interface, an application programming interface, or a voice user interface.

In some implementations, receiving data indicating user selection includes receiving data indicating an interaction with a user interface element corresponding to a particular operation of the predetermined set of operations. The data indicates at least one of a mouse click event, a mouse double click event, a drag-and-drop event, a touch event, a touch gesture event, a voice command event, or one or more keyboard key events. Defining the workflow includes defining the workflow to include the particular operation corresponding to the user interface element.

In some implementations, the method includes: generating, by the one or more computers, a first user interface element representing the first operation and a second user interface element representing the second operation; and presenting, by the one or more computers, the user interface elements within a workflow area of the interface.

In some implementations, the user interface elements are interactive to change a sequence in which operations in the workflow are performed, and the method includes: receiving data indicating a user interaction with one or more of the interface elements representing operations of the workflow; and setting or changing a sequence in which the operations of the workflow are performed based on the data indicating the user interaction.

In some implementations, providing the interface for defining the workflow includes providing a graphical user interface having multiple areas, where the multiple areas include a workflow display area configured to indicate operations in the workflow.

In some implementations, providing the interface for defining the workflow further includes providing, as one of the multiple areas, an area for predefined operations and conditions, where the area for predefined operations and conditions includes (i) interface elements that specify operations and are selectable to include the operations in the workflow and (ii) interface elements that specify conditions and are selectable to apply the conditions to the workflow.

In some implementations, the method includes: receiving data indicating user selection of an interface element in the area for predefined operations and conditions; and in response to receiving the data indicating user selection of the interface element: generating a new interface element representing the operation or condition corresponding to the selected interface element; and placing the new interface element in the workflow display area to indicate the inclusion of the operation or condition in the workflow.

In some implementations, the method includes providing, as one of the multiple areas, a development environment area configured to receive programming code to specify one or more operations to be included in the workflow.

In some implementations, receiving code includes receiving programming code entered by a user into the development environment area, and the method includes, in response to receiving the programming code entered by the user: generating an interface element representing the programming code entered into the development environment area; and placing the new interface element in the workflow display area to indicate the inclusion of the programming code in the workflow.

In some implementations, the method includes providing, as one of the multiple areas, a recording area of the multiple areas including controls to begin and end recording of user-initiated actions, the interface being configured to add recorded user-initiated actions as operations of the workflow.

In some implementations, the method includes: receiving data indicating a first user interaction with an interface element for initiating recording of user-initiated actions; in response to receiving the data indicating the first user interaction, detecting a series of user interactions with the one or more computers; receiving, through the interface, data indicating a second user interaction with an interface element for stopping the recording of user-initiated actions; in response to receiving the data indicating the second user interaction: generating one or more new interface elements representing the tracked user-initiated interactions; and placing the one or more new interface elements in the workflow display area to indicate the inclusion of the tracked user-initiated actions in the workflow.

In some implementations, the method includes providing, as one of the multiple areas, an application programming interface area that includes one or more interface elements specifying one or more third-party application programming interfaces.

In some implementations, the method includes: receiving data indicating an interaction with an interface element, in the application programming interface area, indicating a third-party application programming interface; and in response to receiving the data indicating the interaction with the interface element indicating the third-party application programming interface, including an operation that uses the third-party application programming interface into the workflow.

In some implementations, the method includes providing, as one of the multiple areas, a container area that includes one or more interface elements specifying one or more software images or container-related operations.

In some implementations, the method includes: receiving data indicating an interaction with an interface element, in the container area, that specifies a software image or container-related operation; in response to receiving the data indicating the interaction with the interface element specifying a software image or a container-related operation: generating an new interface element representing the software image or container-related operation corresponding to the interface element interacted with; and placing the new interface element in the workflow display area to indicate the inclusion in the workflow of an operation involving running the software image in a container or other container-related operation.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 2 is a diagram that illustrates example interface displaying a workflow listing.

Like reference numbers and designations in the various drawings indicate like elements.

DETAILED DESCRIPTION

Figure 1A:
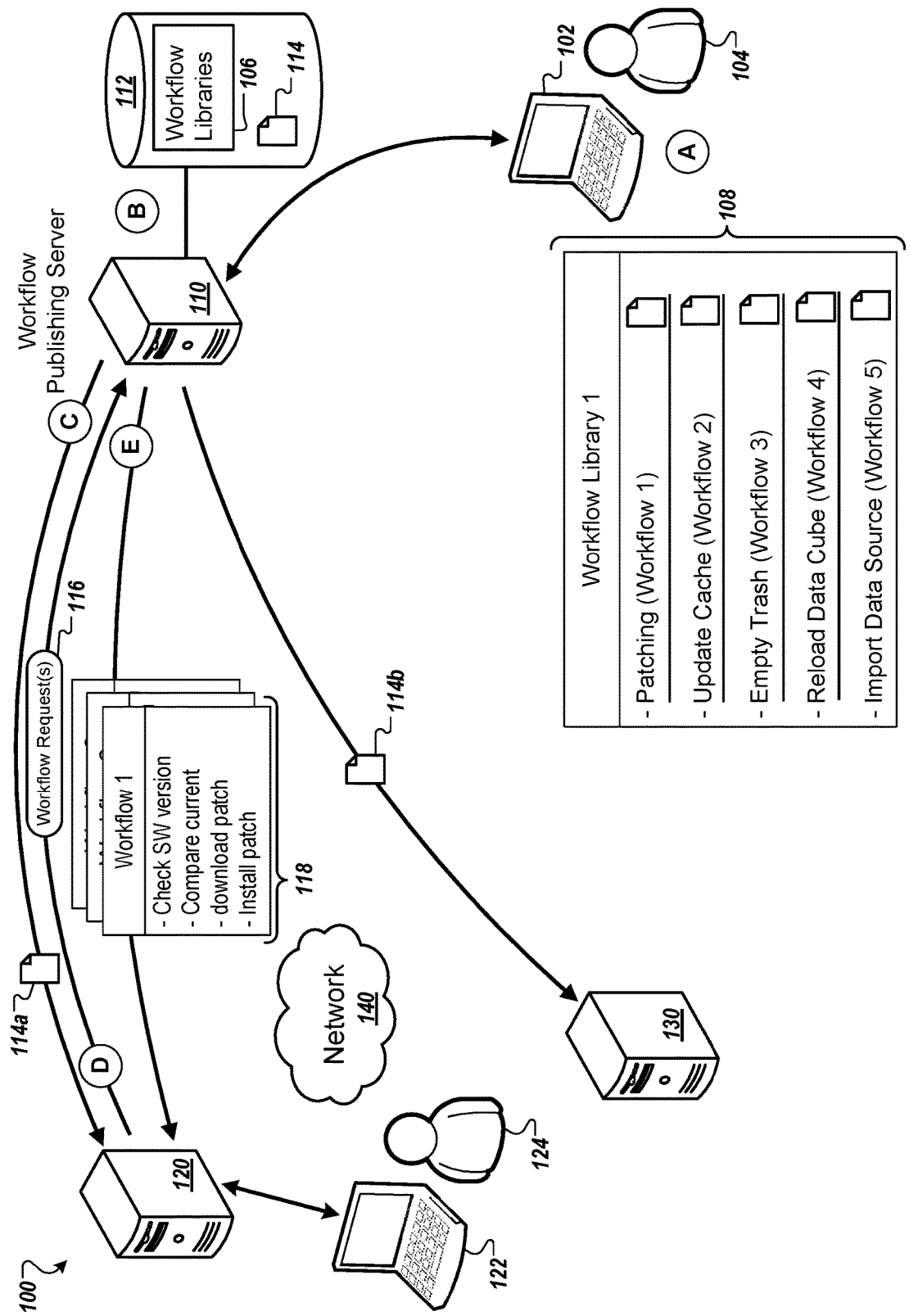
FIGS. 1A-1B are diagrams that illustrate an example system for providing workflows to remote environments.

In some implementations, computing workflows can be defined to facilitate the management or operation of computer systems. A workflow publishing server is configured to distribute computing workflows to third-party servers and users of third-party servers. The workflow publishing server may send a listing of available workflows to other computer systems. The workflow publishing server may receive requests for one or more workflows indicated in the listing, and, in response, provide the requested workflows. Administrators can select from among the sets of available workflows to enable custom combinations of functionality at the systems they manage.

The workflows can be configured to allow administrators to modify the received workflows. For example, an administrator may modify workflows to better address particular problems or errors experienced by the a server, to customize how the workflows are to be implemented, to select a data source to be used by a workflow, to select a destination to be used by a workflow, to link multiple workflows so the execute together, etc.

In some implementations, the workflow publishing server workflows a remote server based on an analysis of error logs, error reports, and/or server manager logs received from the remote server. In analyzing the error logs, error reports, and/or server manager logs, the workflow publishing server may leverage one or more machine learning to identify conditions present at the remote server and to select relevant workflows.

A workflow can specify a set of computing operations to be performed, potentially along with logic to adaptively or selectively vary which operations are performed and how the operations are performed depending on conditions at a computer system. A workflow can be specified in a workflow module, which can be a data package that indicates the operations, rules, parameters, and other elements or characteristics of the workflow. The workflow module can a portable and redistributable data package that is arranged to be read and processed so a receiving computer system can implement the process or operations that it specifies. In some implementations, a workflow module can be executable or interpretable (e.g., a data package with executable or interpretable code), but this is not required. Each workflow can be specified a corresponding workflow module that specifies the operations and other elements of the workflow, and allows the workflow to be transmitted from one device or system to another device or system that receives and carries out the operations specified in the workflow module.

For example, a workflow can include instructions for a computer system to perform a sequence of actions or functions. The workflow can specify data to be acquired (e.g., to determine current settings, current performance metrics, etc.) and conditions to be evaluated, which can result in different sets of operations being performed by the computer system. Workflows can have many different uses, such as to install patches, change settings, fix causes of errors, optimize performance, resolve incompatibilities, resolve conflicts (e.g., between configuration settings, software versions, files, etc.) correct dependencies (e.g., by updating references to files or data, or providing files or data that were missing or inadequate), refresh caches, optimize data sets, monitor performance, and more. Frequently, a workflow is designed to cause a specific purpose or result when run. An administrator can select a workflows to be run periodically to automate maintenance, or workflows may be run on-demand.

A workflow can be packaged in a standard, lightweight form that can be interpreted or executed without being compiled. Part of a workflow can be a collection of commands to be performed, similar to a script or batch file. As discussed further below, a workflow can have various types of logic integrated into the workflow that allow the execution of the commands to be varied according to the context of the computer for which it is run. For example, a workflow may include different mutually exclusive branches representing different sets of commands, and the computer that executes the workflow can determine which branch is appropriate when the workflow is run. As another example, the workflow can include parameters (e.g., fields, variables, etc.) that are adaptively set for the particular computer running the workflow. These parameters for execution of the workflow may be edited and customized by an administrator, or may be set by the operation of the workflow based on data collected by the workflow through interaction with elements of the computer system. The commands that a workflow instructs to be performed can be commands to invoke functions of software already installed on a computer system, such as functions of an operating system, applications, tools, and so on that are already installed on the computer system. A workflow may also initiate other types of actions, such as interacting with another system using an application programming interface (API), changing settings of the computer or connected system, and so on. In some implementations, the workflow itself may include executable code to be run.

The workflow can be packaged as a module that is redistributable, and so does not need an installation process to be used. Additionally, the module can be editable so that users can tailor the operation for their respective needs. In some implementations, the workflow may designate fields that are customizable by a user. For example, the workflow can include fields for time periods to take actions, resources (e.g., files, folders, devices, etc.) that operations of the workflow act on, values for settings, and so on. Further, the workflow can be editable to add, remove, and modify operations of the workflow.

A server system may provide a configuration interface (e.g., through an application on a client device, a web page, a web application, etc.) that allows an administrator to configure the operation of the server system. The management interface can be configured to communicate with a remote management server to request and receive workflow modules, or have workflow modules and workflow lists pushed from the management server. Once a workflow is received, the configuration interface can include features to request, review, edit, activate, and deactivate workflow modules. For example, the configuration interface can enable a user to view the properties of a specific workflow module, view the operations the workflow module is configured to perform, edit those operations and/or resources the operations use or act on, and save any changes to the customized workflow module. The configuration interface can enable the user to initiate running the workflow, for example, by manually initiating execution, by setting the workflow to be run at a scheduled time (e.g., once or on a recurring schedule), or by setting the workflow to be run in response to detecting one or more conditions (e.g., to run a workflow when load exceeds a threshold, or when a particular type of error occurs, or for another condition).

Each workflow may include or otherwise be associated with a set of metadata that specifies the applicability of the workflow to different systems. For example, the metadata may indicate a type of result achieved by the workflow, a set or range of version codes for software that the workflow is compatible with, a type of error or condition that the workflow is configured to address, user permissions or security credentials needed to run the workflow, dependencies needed by the workflow, a set of applications used by the workflow, a set of settings changed by the workflow, and so on. This metadata can enable computer systems to determine the applicability of different workflows to particular systems.

In general, a server environment refers to software that provides server functionality over a network and/or a combination of hardware and software that provides server functionality. For example, a server environment may be a particular server, e.g., an on-premises server. As another example, a server environment may be a virtual machine for a server, a containerized server (e.g., made up of one or more one or more application containers), etc. Server environments can be virtualized, especially when hosted using third-party cloud computing infrastructure. A server environment may represent a single function or application (e.g., a web server, a database server, a file server, an application server, etc.) or may represent the software (e.g., modules, containers, virtual machines, etc.) for a combination of multiple functions. In a similar manner, while a computing environment or computer environment represent a single physical computer, including its hardware and software, the computing environment may be a software environment and there does not need to be a 1-to-1 mapping. For example, a cluster of computers together may provide a computing environment, and a single computer may provide multiple computing environments. As another example, a cloud computing system can host many different computing environments as virtual machines, containerized implementations, and other forms.

A computing environment or server environment can include the combination of one or more of the operating system, applications, processes, interfaces, network connections, data source connections, files and data sets, and so on, each of which may affect how the environment processes data and interacts with users and other systems. A computing environment or server environment can include the hardware resources assigned, including one or more of the processors, memory, storage devices, and other hardware. Nevertheless, given the extensive use of virtualization and cloud computing hosting, an environment typically not tied to a specific set of hardware and in many cases may be moved or replicated on different hardware (e.g., from one server to another server, from a local server to a cloud computing system, etc.).

Figure 1B:
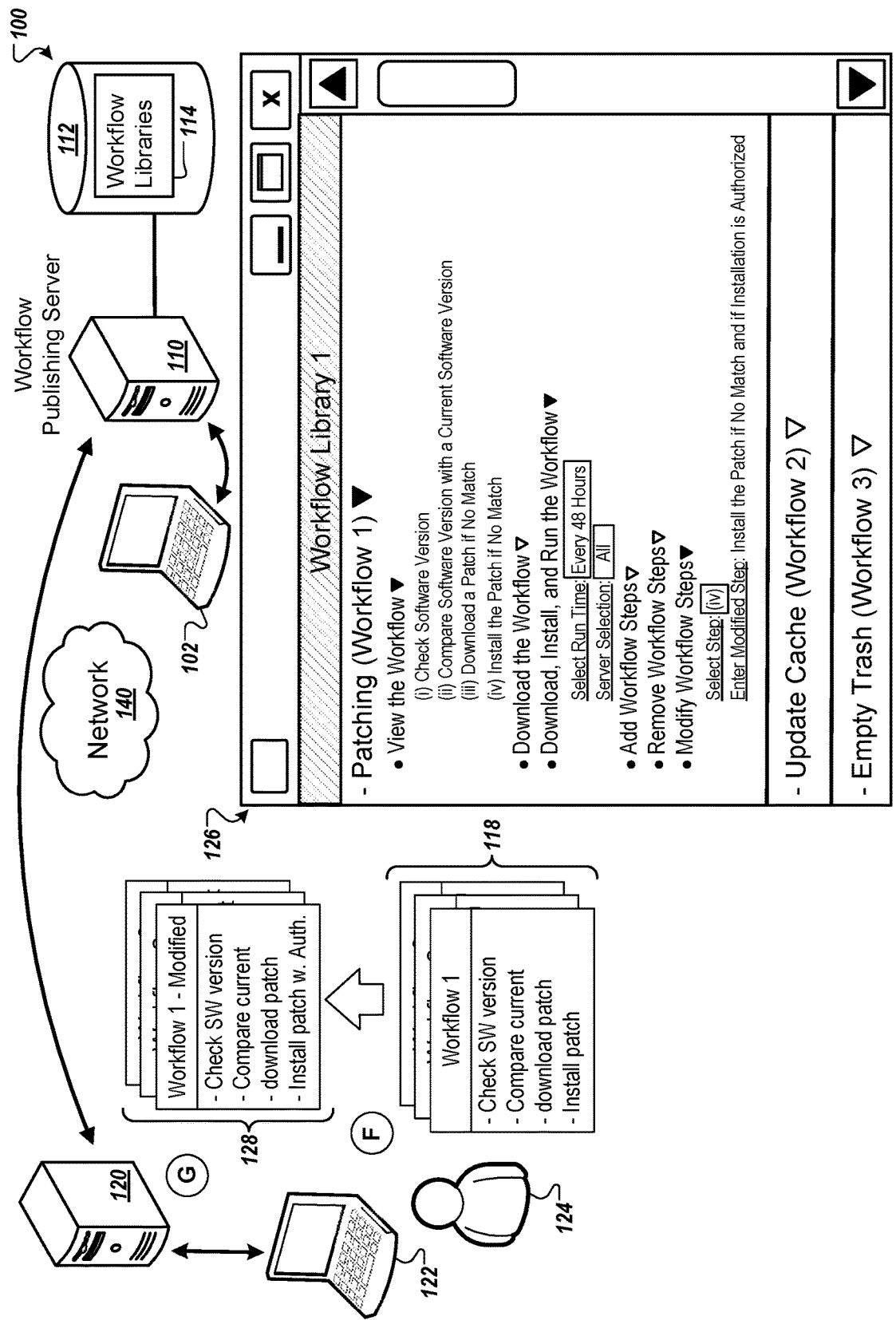

FIGS. 1A-1B are diagrams that illustrate an example system 100 for providing workflows to remote environments, such as third-party servers. The system 100 includes a workflow publishing server 110 and an administrator device 102. The system 100 is able to transmit one or more workflows to servers 120 and 130 over a network 140, so that the servers 120 and 130 can customize and run the received workflows.

The system 100 allows the workflow publishing server 110 to push one or more workflows to the third-party servers 120 and 130. The system 100 also allows one of the third-party servers 120 and 130 to pull one or more workflows from the workflow publishing server 110. The workflow publishing server 110 may provide various different systems with a listing of workflows that are available. When a system receives a workflow from the workflow publishing server 110, the workflow can be customized before it is run. In general, workflows each specify a set of operations to be performed. The workflow can designate the performance of operations to be conditional on the occurrence of particular events or conditions. A workflow may contain mutually exclusive alternatives or branching sets of operations, where one set of operations is performed instead of another set based on the conditions that are satisfied.

FIGS. 1A-1B also illustrate a flow of data, shown as stages (A) to (I), with each representing a step in an example process. Stages (A) to (I) may occur in the illustrated sequence, or in a sequence that is different from the illustrated sequence. For example, some of the stages may occur concurrently.

The administrator device 102 can be a computing device, such as a desktop computer, a laptop computer, a mobile phone, a smart phone, a personal digital assistants (PDA), a tablet computer, or other computing devices. The administrator device 102 can communicate with the workflow publishing server 110 over, for example, the network 140.

The network 140 can include public and/or private networks and can include the Internet.

The workflow publishing server 110 has associated data storage 112 storing one or more workflow libraries 106. The workflow publishing server 110 may include one or more computing devices. The workflow publishing server 110 communicates with servers 120 and 130 over the network 140. In some implementations, one or more computers of the workflow publishing server 110 may communicate with the administrator device 102 and one or more other computers may perform other tasks, such as communicating with the servers 120 and 130. The workflow publishing server 110 may communicate with the servers 120 and 130 through one or more application programming interfaces (APIs).

The servers 120 and 130 may each include one or more computing devices. The servers 120 and 130 are remote with respect to the workflow publishing server 110. The servers 120 and 130 may each be part of a cloud computing platform (e.g., Amazon Web Services (AWS), Microsoft Azure, and so on).

In the example of FIGS. 1A-1B, the workflow publishing server 110 provides workflows for the management of a computing platform that includes software run by the servers 120 and 130. For example, the platform may be a data analytics software platform that includes one or more applications or services, e.g., web server functionality, functionality to access data repositories, query response functionality, functionality to generate visualizations, and so on. The servers 120 and 130 may each run the software of the platform in independently managed systems, for example, for different companies and organizations. As a result, the servers 120 and 130 represent systems that are managed and operated independently from each other and from the workflow publishing system 110. The workflow publishing server 110 can make the workflows available so that the administrators of third-party systems, e.g., servers 120 and 130, can separately select and run the workflows to enhance the maintenance and operation of the software platform. In some implementations, the workflow publishing server 110 is operated by or is affiliated with the provider of the software platform. The workflows may be created, tested, and/or validated before being made available to other systems by the workflow publishing server 110. For example, the workflows can be trusted or certified sets of operations for maintaining or optimizing the software platform.

The techniques disclosed in this document can increase the efficiency and accuracy of server system management. One or more workflows can be accessed, implemented, and processed in order to automate many tasks that would otherwise require significant manual input. In addition, by reducing the amount of manual input needed, server system management using the disclosed techniques is less prone to errors and/or reaction inconsistencies. The disclosed techniques further improve the efficiency and accuracy of server system management by, in some implementations, recommending specific workflows for a particular system based on of their server system and/or their determined needs. The recommended workflows may be determined based on an analysis of one or more error reports or error logs for a system. The recommended workflows may be determined based on analysis of previous actions taken, such as a log of actions that an administrator took to maintain or adjust a server. The recommended workflows may be selected by leveraging one or more machine learning. The disclosed techniques further improve the efficiency and accuracy of server system management by allowing the customization of workflows to the specific needs of a particular administrator or system.

The techniques disclosed in this document can increase the reliability of server systems. Workflow operations may be created and/or customized such that they are performed automatically when certain conditions are satisfied. These operations may include, for example, updating software, installing patches, importing new data, or removing old data that can increase and maintain the reliability of server systems. Conditions which may trigger the performance of these operations may include, for example, a determination that a software update or patch has come available, if a certain amount of time has passed since the operation was last performed, or a determination that new data has come available. Accordingly, server system reliability is improved by ensuring, for example, that the server system is using the latest software, has the latest patches installed, is using the newest available data, etc. In some implementations, the disclosed system is able to recommend one or more workflows to be implemented in a particular server system. The disclosed system may recommend workflows when it determines that the workflow may increase the reliability of the server system or increase the efficiency of the server system, e.g., through an analysis of the server system's error reports or server manager logs.

As shown in FIG. 1A, in stage (A), a workflow library 106 is created or updated. This can involve creating, modifying, testing, and/or validating workflows to be included in the workflow library 106. 106 As shown, a first workflow library 106 includes five workflows: a first workflow for patching software ("Workflow 1"), a second workflow for updating a cache of a computer system ("Workflow 2"), a third workflow for emptying a trash folder of a file system ("Workflow 3"), a fourth workflow for reloading an online analytical processing (OLAP) data cube ("Workflow 4"), and a fifth workflow for importing a data source ("Workflow 5"). The administrator 104 may upload the new or modified workflow library 106 to the workflow publishing server 110 over the network 140 or over a different network Validating or testing a workflow of a workflow library may involve performing one or more of the operations within a workflow (or all operations within a workflow) on a testing environment. The testing environment may be a computer, a computing system, a server environment, a virtual machine, etc. During validation, the operation of the workflow can be tested to ensure proper results are achieved, that security is maintained, compatibility is achieved with an appropriate set of software versions or system configurations, etc.

The workflows in the workflow library 106 can be created on the device 102 or any of various other devices and uploaded to the workflow publishing server 110 for storage and distribution.

In stage (B), the workflow publishing server 110 adds the new or modified workflows to the library 106, which is stored in the data storage 112. This may involve replacing a previous version of the workflow library 106 or updating a previous version of the workflow library 106.

When the workflow publishing server 110 adds the new or modified workflow library 106 to the workflow libraries 106, it may also generate or update a workflow listing 114. The workflow listing 114 may list all workflows included in the workflow libraries 106. The workflow listing 114 may list all workflows from a particular workflow library. For example, there may be separate workflow listings for each workflow library.

The workflow listing 114 may include information about each of the workflows within the workflow listing 114 as is discussed in more detail below with respect to FIG. 2. This information may include metadata, such as a name of the workflow, a purpose of the workflow or an error that the workflow addresses, a description of the operations within the workflow (e.g., which may also include required conditions for the workflow to be performed), a list of persons who can initiate running of the workflow, security permissions for the workflow, and software versions that the workflow is compatible with.

In stage (C), the workflow publishing server 110 sends workflow listings 114a and 114b to the servers 120 and 130 respectively. The workflow listings 114a and 114b can represent a catalog of the available workflows that can be obtained from the workflow publishing server 110. In some cases, the workflow listings 114a and 114b include all workflows, and in other cases they may represent customized subsets of the total set of workflows, e.g., subsets determined to have appropriate compatibility with or relevance to the servers 120 and 130.

The workflow listings 114a and 114b may be sent by the workflow publishing server 110 to the servers 120 and 130 respectively over the network 140. Here, the workflow publishing server 110 pushes the workflow listings 114a to the server 120, and the workflow listing 114b to the server 130. The workflow publishing server 110 may push the workflow listings 114a and 114b if they have been recently updated (e.g., new workflows have been added, a workflow library which corresponds with the workflow listing has been updated or added, etc.). The workflow publishing server 110 may push these workflow listings 114a and 114b periodically. For example, the workflow publishing server 110 may have scheduled to send the server 120 a workflow listing every two days. The schedule for the server 130 may be different than the schedule of the server 120. For example, the workflow publishing server 110 may have scheduled to send the server 130 a workflow listing every week as opposed to every two days for the server 120.

In some implementations, a server, such as the server 120 or 130, requests a workflow listing from the workflow publishing server 110. The third-party server may schedule workflow listing requests so that they are sent periodically.

In some implementations, different workflow listings 114a and 114b are provided to the servers 120 and 130. For example, the servers 120 and 130 may run different versions of software or have different configurations, so that different sets of workflows are applicable to each. The workflow publishing server 110 can select a customized subset of the workflows in the workflow library 106 for each server, based on known characteristics of the servers. For example, the servers 120 and 130 can periodically provide configuration data indicating software installed, versions of the software, configuration settings, load levels, usage logs, error logs, and so on. From this information, the workflow publishing server can filter the workflow listing 114 so that each workflow listing 114a, 114b has a customized, filtered subset of the workflows.

In some implementations, the workflow listings 114a and 114b are listings of recommended workflows that the workflow publishing server 110 selects as being recommended for the servers 120 and 130. In these implementations, the workflow publishing server 110 may receive (e.g., periodically) error reports or error logs experienced by the server 120 and/or the server 130, and server manager logs from the server 120 and/or 130. The workflow publishing server 110 may analyze these error reports, error logs, and/or server manager logs, and recommend one or more workflows to the respective third-party server.

An analysis of these error reports, error logs, and/or server manager logs may be used to identify workflows that solve specific problems experienced by the respective third-party server and/or workflows that solve similar problems experienced by the respective third-party server. For example, an analysis of an error report of the server 120 may reveal that a number of errors are occurring because the software is out of date. In this example, the workflow publishing server 110 may search through the metadata of the workflows in the workflow libraries 106 to identify any workflows that are related to updating server software or patching server software, and provide the identified workflows to the server 120. A recommended workflow does not need to solve the exact same problem to be recommended because, as will be discussed in more detail below with respect to FIG. 1B, the workflow can be customized for the particular server that it is to be implemented in.

An analysis of these error reports, error logs, and/or server manager logs may reveal workflows that can increase system stability (e.g., if it is determined that one or more errors are due to a high server load, or a high degree of fluctuation in server load, etc.). An analysis of these error reports, error logs, and/or server manager logs may reveal workflows that can reduce user input (e.g., if it is determined that server managers or users are repeatedly doing tasks that could be automated by a workflow, if it is determined that the one or more errors are due to human input error, or if it is determined that the one or more errors are due to inconsistent human oversight). The workflow publishing server 110 may filter out workflows from the recommended workflows if they are incompatible with the respective third-party server, e.g., the workflow requires a different software version than what is installed on the server. The workflow publishing server 110 may provide these recommended workflows to the respective third-party servers as part or all of the workflow listings 114a and 114b.

In some implementations, the administrator 104 may select the one or more workflows to recommend to the servers 120 and 130 based on the results of analysis performed by the workflow publishing server 110 on the respective error reports, error logs, critical log files (e.g., logs for an application server, logs for an intelligence server, logs for queue producers, logs for queue consumers, etc.), core files, crash dumps, and/or server manager logs.

In some implementations, the workflow publishing server 110 leverages one or more machine learning in order to analyze the respective error reports, error logs, critical log files (e.g., logs for an application server, logs for an intelligence server, logs for queue producers, logs for queue consumers, etc.), core files, crash dumps, and/or server manager logs associated with, for example, the servers 120 and 130. In these implementations, the workflow publishing server 110 may capture other attributes and/or characteristics of the servers 120 and 130 such as, for example, the operating system (OS) used, the version of the OS used, applications or services run, versions of applications or services run, hardware characteristics, etc. These attributes and/or characteristics may be made available to and used by the one or more machine learning. In these implementations, the workflow publishing server 110 may feed the error reports, error logs, critical log files, core files, crash dumps, server manager logs monitor, attributes, and/or characteristics associated with, for example, the servers 120 and 130 to the one or more machine learning to see if the server conditions matched known defects. Using this information, the one or more machine learning may determine one or more server conditions. The one or more machine learning may represent the one or more server conditions as a pattern.

The output of the one or more machine learning may be used by the workflow publishing server 110 or the administrator 104 to select one or more workflows for recommendation. For example, if the observed server conditions/pattern matched a previously known defect, the one or more machine learning may recommend a known workflow associated with those conditions. If the observed server conditions/pattern did not match a known defect, then an analysis would be done for these new conditions/new pattern, and a new workflow may be generated to address these new conditions/new pattern. The analysis may be performed by a user of the workflow publishing server 110. The new workflow may be generated by a user of the workflow publishing server 110. The analysis may be performed automatically by the workflow publishing server 110 through, for example, trial and error and/or leveraging one or more machine learning to determine which workflows are likely work based on, for example, what workflows are associated with conditions similar to the observed conditions, what workflows have a high rate of success, etc. For example, the workflow publishing server 110 may attempt to use existing workflows to see if any have a beneficial effect on the server conditions. The workflow publishing server 110 may test the existing workflows in the order of which are determined to have the highest likelihood of success based on, for example, leveraging the one or more machine learning. If one or more workflows are determined to have a beneficial effect on the observed server conditions (e.g., less defects, less severe defects, better performance, etc.), the workflow publishing server 110 may associate those one or more workflows with the observed conditions/pattern, e.g. associate those one or more workflows with the specific defect detected.

The one or more machine learning may include one or more machine learning models. The one or more machine learning models may include an unsupervised learning model.

The workflow listing 114a may be the same or different from the workflow listing 114. The workflow listing 114 may be modified for the server 120 in order to generate the workflow listing 114a. For example, the workflow listing 114a may contain the workflows found in the workflow listing 114 that are compatible with the software of server 120. Similarly, the workflow listing 114b may be the same or different from the workflow listing 114. The workflow listing 114 may be modified for the server 130 in order to generate the workflow listing 114b. For example, the workflow listing 114b may contain the workflows found in the workflow listing 114 that are compatible with the software of server 130.

In stage (D), after having received the workflow listing 114a, a user 124 of the client device 122 may select one or more workflows from the workflow listing 114a for download from the workflow publishing server 110. In selecting one or more workflows from the workflow listing 114a, one or more workflow requests 116 are generated by the server 120 and sent to the workflow publishing server 110. The one or more workflow requests 116 may contain a name or other indication of the one or more selected workflows, and/or a name or other indication of the source of the one or more workflows, such as a name or other indication of the one or more workflow libraries that correspond with the one or more selected workflows.

The one or more workflow requests 116 may contain additional information, such as information about the server 120. This additional information may contain, for example, the software version(s) used by the third-party server, error logs or reports related to the third-party server, server manager logs, storage capacity of the third-party server, remaining storage space of the third-party server, performance information related to all or part of the third-party server (e.g., bandwidth, load experienced, amount of memory, number of processors, type of processors, etc.), The one or more workflow requests 116 may be sent to the workflow publishing server 110 over the network 140.

In some implementations, the one or more workflow requests 116 do not specifically name or identify one or more workflows. In these implementations, the workflow requests 116 may contain a query for workflows for the workflow publishing server 110. The query may include information naming or describing a specific error, condition, or other issue experienced by the server 120. The workflow publishing server 110 may access the workflow libraries 106 through the data storage 112, and compare the query information to the metadata for each of the workflows. In comparing the query information to the workflow metadata, the workflow publishing server 110 may identify one or more workflows that specifically address the error, condition, or other issue experienced by the server 120, and/or one or more workflows that are related to the error, condition, or other issue experienced by the server 120. The workflow publishing server 110 may leverage one or more machine learning in identifying the one or more workflows.

In stage (E), in response to receiving the one or more workflow requests 116, the workflow publishing server 110 sends the requested workflows 118 (or a subset of the requested workflows) to the server 120. The workflow publishing server 110 may first analyze the received one or more workflow requests 116 to determine which workflows are being requested. The workflow publishing server 110 may access the data storage 112 to obtain the requested workflows 118 in preparation of sending the requested workflows 118 to the server 120. Here, the user 124 had requested three workflows: including Workflow 1, Workflow 2, and Workflow 3. These three workflows make up the requested workflows 118 and are sent to the server 120. In addition to sending the workflows, the workflow publishing server 110 may provide instructions for installing and running each of the workflows in the requested workflows 118.

In the example, a workflow module can be used to transmit workflows. A workflow module can be a data package that defines a particular workflow, e.g., Workflow 1 for patching. The workflow module may be a data package or one or more files (e.g., script files) that provides instructions for a set of operations to be performed. For example, the workflow module may include instructions for the client device 122 (and/or the server 120) to perform a set of operations related to patching. Specifically, the workflow module may include, for example, instructions for the client device 122 to (i) check the software version (e.g., current software version and/or required software version), (ii) compare the current software version with the required software version, (iii) download a patch for the required software version, and (iv) install the patch for the required software version. The workflow module can be arranged and formatted so that the client device 112 or another device receiving the workflow module can automatically perform some or all of the operations of the specified workflow upon receiving and processing the workflow module.

The workflow module may optionally be executable. That is, the workflow module may include an executable file (e.g., compiled software code) that can be executed by the client device 122 (and/or the server 120). Alternatively, the workflow module may be a data package containing multiple executable files that can be executed by the client device 122 (and/or the server 120). This is only one of many options for specifying a workflow, many of which do not involve or require executable code. In fact, for cross-platform support, it may be advantageous in many implementations to specify instructions in a form that is not compiled for a specific operating system or architecture, but nevertheless indicates operations to perform.

Similarly, the workflow module may be interpretable. That is, the workflow module may include instructions that are not compiled but nevertheless can be performed by the client device 122 (and/or the server 120) after receiving the workflow module.

In some implementations, the workflow publishing server 110 removes one or more workflows from the requested workflows 118 due to a determination that one or more workflows are incompatible with the server 120. This subset of the requested workflows 118 may be sent to the server 120 in place of the requested workflows 118. In these implementations, a notification may be provided to the server 120 indicating that one or more workflows were not sent due to incompatibility.

In some implementations, the workflow publishing server 110 pushes one or more workflows to the server 120 or the server 130 without the need for any workflow requests, such as the one or more workflow requests 116. In these implementations, the workflow publishing server 110 may push recommended workflows in response to analysis of a third-party server's error reports, error logs, and/or server manager logs. The workflow publishing server 110 or the administrator 104 may identify which workflows to recommend in accordance with the methods described above with respect to stage (C).

As shown in FIG. 1B, in stage (F), the user 124, through an interface 126 of the client device 122, inspects the requested workflows 118 and generates a set of modified workflows 128 from the requested workflows 118. Here, the user 124 has selected Workflow 1 in the interface 126, allowing the user 124 to inspect Workflow 1 and modify it. The user 124 has selected the option to "View the Workflow," revealing the operations contained within Workflow 1. These operations include a first operation to check the software version of the server, a second operation to compare the software version with a current software version, a third operation to download a software patch if the checked software version does not match the current software patch, and a fourth operation to install the software patch if the checked software version does not match the current software patch. Other options that the user 124 has not selected include an option to download the workflow, an option to add workflow steps (e.g., add additional operations to Workflow 1 that may or may not be conditional, or add alternative operations to the workflow), and an option to remove workflow steps (e.g., remove an operation from Workflow 1).

An option that the user 124 has selected is an option to download, install, and run the workflow. By selecting this option, the user 124 is presented a field to select or enter a run time, and a field to select or enter the specific servers or server environments that Workflow 1 should be installed on or otherwise implemented in. In the run time field, the user 124 has selected to run Workflow 1 every 48 hours. The user 124 may have been able to select or enter other options, such as every 12 hours, every 24 hours, every week, every month, every year, once—immediately, once—with a delay (e.g., a delay of 1 hour, 2 hours, 12 hours, 1 day, 1 week, etc.), etc. In the server or server environment field, the user 124 has selected or entered "all." Accordingly, the user 124 has chosen for Workflow 1 to be installed and run on all of server 120's servers and/or server environments, or on all of server 120's compatible servers and/or server environments.

An option the user 124 has selected is an option to modify workflow steps. By selecting this option, the user 124 is presented a field to select or enter a step, e.g., an operation, to modify and a field to enter the modification(s). Here, the user 124 has selected or entered the fourth operation, the operation to install the software patch if the checked software version does not match the current software patch. The user 124 has modified the fourth operation so that it now includes an additional condition that the installation of the patch must also be authorized by a server manager or admin.

The user 124 may be able to modify the workflows in other ways. For example, the user 124 may be able to select from a list of recommended or frequently used operations. This list may be presented to the user 124 on the interface 126. When the user selects an operation from the list, the operation may replace a currently selected operation or may be added to the operations of the corresponding workflow. The user 124 may be able to drag one or more operations from the list into the workflow. The user 124 may be able to rearrange operations in the workflow by, for example, dragging them into different positions. The user 124 may be able to modify a workflow by entering code that is then added to the computer code corresponding with the workflow, e.g., in order to add one or more new operations to the workflow, add one or more conditions to the workflow or to individual operations in the workflow, etc. The user 124 may be able to modify a workflow by modifying the computer code corresponding with the workflow, e.g., in order to modify existing operations or conditions, remove existing operations or conditions, etc.

The operations of the workflow may be conditional on one or more events being satisfied. These conditions may be temporal conditions, e.g., a date, an elapse of a certain amount of time, etc. These conditions may be satisfied through a triggering event, e.g., the occurrence of an error or a particular error, an instruction or action by a server manager or administrator, a state of the server system, a server load threshold being met, etc. These conditions may be satisfied through the successful performance of one or more higher order operations in the set of operations, e.g., operations that are to be performed before the operation at issue. These conditions may be predetermined. These conditions may be set by the user 124 through the interface 126.

Similarly, the workflow itself may be conditional on one more events being satisfied before it is processed. These conditions may be temporal conditions, e.g., a date, an elapse of a certain amount of time, etc. These conditions may be satisfied through a triggering event, e.g., the occurrence of an error or a particular error, an instruction or action by a server manager or administrator, a state of the server, a server load threshold being met, etc. These conditions may be satisfied through the successful performance of an operation of another workflow or of the successful processing of another workflow. These conditions may be predetermined. These conditions may be set by the user 124 through the interface 126. These conditions may include the occurrence of an event, the nonoccurrence of an event, particular data being identified, particular data not being identified, particular data being matched, particular data not being matched, the time of day, the day of the week, the time of year, a status of a server, the load on a server reaching a threshold level, the security permissions of a user, etc.

The workflows may each contain branching or alternative operations. For example, Workflow 1 may contain a set of alternative operations where a match is found between the checked software version and the current software version. In this example, Workflow 1's alternative operations may include an operation to schedule a check for updates one week from now, an operation to generate a notification indicating that the server is currently running the most up-to-date software, and an operation to generate a notification indicating the scheduled software check if the software check is successfully scheduled. As demonstrated in the example, the branch or path of operations that is performed during the processing of a workflow, such as during the processing of Workflow 1, may depend on the particular conditions satisfied and/or on the successful performance of a higher order operation.

By modifying (e.g., customizing) the requested workflows 118 for the server 120, or for particular servers or server environments within or part of the server 120, the user 124 generates the set of modified workflows 128. In some implementations, the modified workflows 128 are generated in response to the user saving or submitting their modifications to the requested workflows 118.

The user 124 may be able to modify the requested workflows 118 in other ways. For example, the user 124 may be able to select a source to be used by a particular workflow, such as a data source. For example, the user 124 may be able to select a destination to be used by a particular workflow. For example, the user 124 may be able to string multiple workflows together. For example the user 124 may be able to select a script to be used by or with a particular workflow.

At stage (G), the user 124 implements the modified workflows 128 into the server 120. Implementing the modified workflows 128 in the server 120 may involve installing the modified workflows on the server 120, on one or more particular servers part of the server 120, or one or more particular server environments within or part of the server 120. Implementing the modified workflows 128 in the server 120 may involve running (e.g., processing) the modified workflows 128, scheduling one or more times to run each of the modified workflows 128, or setting one or more other conditions (e.g., triggering events) for each of the modified workflows 128 that when satisfied result in running the modified workflows 128. Implementing the modified workflows 128 in the server 120 may involve stringing a workflow from the modified workflows 128 to another workflow, such that the processing of one of the strung workflows is a precondition to the processing of the other strung workflow.

FIG. 2 is a diagram that illustrates example interface 202 displaying the workflow listing 114a as previously shown in FIG. 1a in more detail. As previously mentioned, the workflow listing 114a may contain metadata for each of the workflows within the listing. The metadata may include a name of the workflow, a purpose of the workflow or an error that the workflow addresses, a description of the operations within the workflow (e.g., which may also include required conditions for operation performance), a list of persons who can access the workflow, security permissions for the workflow, and software versions that the workflow is compatible with.

As shown, the workflow listing 114a includes a first row 204 for Workflow 1, a second row 206 for Workflow 2, and a final row 208 for Workflow 5. The workflow listing 114a also includes a column 210 for the names of each of the workflows, a column 212 for the purpose or error to be addressed by each of the workflows, a column 214 for the descriptions and/or required conditions of each of the workflows, a column 216 for the security permissions required for each of the workflows, and a column 218 for the compatible software versions for each of the workflows.

As shown, different workflows may require different security permissions. For example, as shown in column 216 of row 204, Workflow 1 requires a higher security permission of "Full Control" or "Modify" in order to install and/or process Workflow 1, whereas, as shown in column 216 or row 208, Workflow 5 allows many more security permissions to install and/or process Workflow 5. The reason why Workflow 1 may require higher security permissions than Workflow 5 may be due to the operations within each of the workflows. The operations of Workflow 1, as can be seen in column 214 of row 204, involve downloading and installing software which may be viewed as high risk operations (or high risk when compared with the operations of Workflow 5). The operations of Workflow 5, as can be seen in column 214 of row 208, involve identifying and importing data, which may be viewed as low or medium risk operations (or low or medium risk when compared with the operations of Workflow 1).

Figure 3:
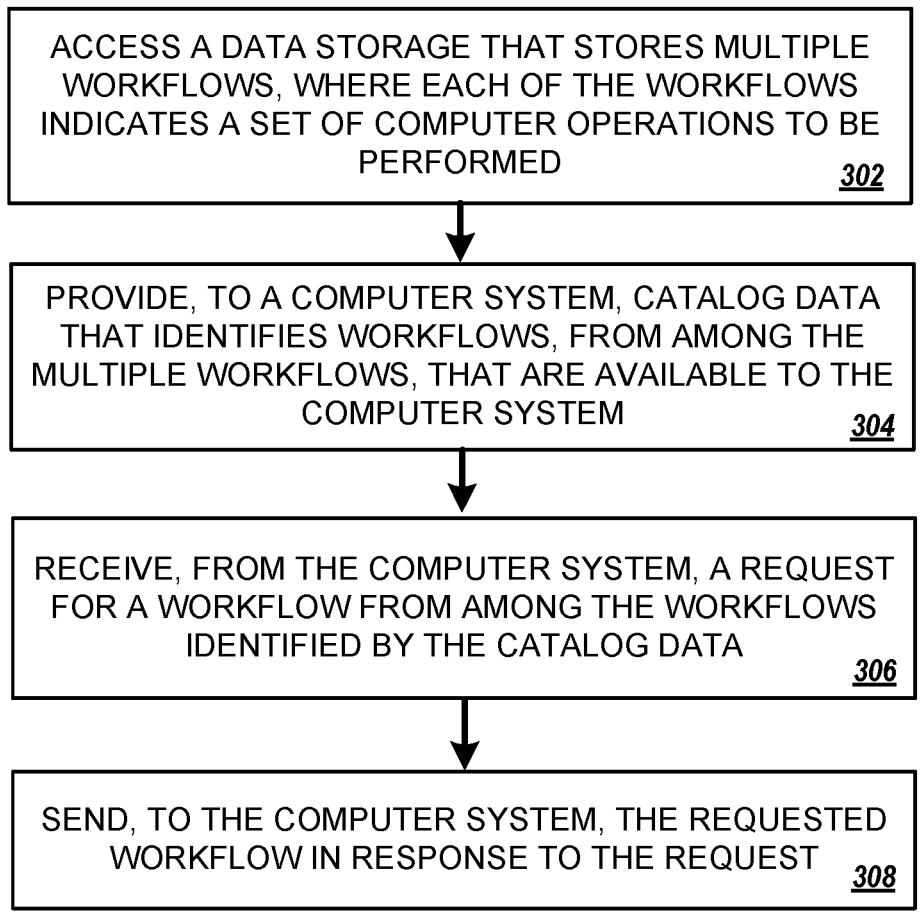
FIG. 3 is an example process for providing workflows to remote environments.

FIG. 3 is an example process 300 for transmitting workflows to remote environments. The process 300 can be performed, at least in part, using the system 100 described herein.

The process 300 includes accessing data storage storing multiple workflows, where each of the workflows indicates a set of computer operations to be performed (302). The computer operations may include downloading software, checking for software updates, updating software, installing software, running software, importing data, exporting data, checking for new or different data, running a script, generating data, generating a notification, sending a notification, etc. The computer operations may be conditional on the satisfaction of one or more requirements. These requirements may include the performance of another operation, the processing of a workflow, a time having elapsed, a triggering event, etc. The data storage may be on-site.

Thee data storage can store metadata associated with the workflows. The metadata for a particular workflow may include information such as a name of the workflow, a purpose of the workflow or an error that the workflow addresses, a description of the operations within the workflow, a list of persons who can access the workflow, security permissions for the workflow, and/or software versions that the workflow is compatible with.

A workflow can indicate a sequence of multiple operations that are to be performed in a predetermined order. Examples of operations include checking a software version of a server, checking the most recent software version, comparing software versions, downloading software, uploading software, identifying data, uploading data, storing data, downloading data, deleting or clearing data, comparing data, determining destinations, and/or determining sources. As an example, a workflow may include an operation to check the version of software currently used by a particular server, to check the most recent version of the software, and to compare the currently used version with the most recent version. In this example, the operations may need to be performed in a predetermined order. For example, the workflow may need to first check the version of software currently used by the server, then check the most recent version of the software once the first check is performed, and, only after both checks are performed, compare the currently used version with the most recent version. The predetermined order may be set when the one or more workflows are initially created, e.g., by the administrator 104. The predetermined order may modified at a third party server, e.g., by the user 124 of the client device 122 or by a different user of a different client device. The predetermined order may be set at a third party server, e.g., by the user 124 of the client device 122 or by a different user of a different client device.

A workflow may include multiple conditional operations that are designated to be performed when corresponding conditions are satisfied. Examples of conditions include the occurrence of an event, the nonoccurrence of an event, particular data being identified, particular data not being identified, particular data being matched, particular data not being matched, the time of day, the day of the week, the time of year, a status of a server, the load on a server, the security permissions of a user, etc.

In some cases, a workflow includes a chain of conditional operations. The chain of conditional operations may include a first operation and a first condition and a second operation and a second condition. Performance of the first operation may be dependent on the first condition being satisfied, and performance of the second operation may be dependent on the second condition and the first condition being satisfied. As an example, when either the first condition or the second condition is not satisfied, the server running the workflow may automatically abort the workflow and/or may automatically restart the workflow, e.g. after a predetermined amount of time. Similarly, when both the first condition and the second condition are not satisfied, the server running the workflow may automatically abort the workflow and/or may automatically restart the workflow, e.g. after a predetermined amount of time. As an example, when the first condition is satisfied but the second condition is not satisfied, the server running the workflow may wait a predetermined amount of time before automatically aborting the workflow or automatically restarting the workflow. During this predetermined amount of time, the server and/or the workflow may check to see if the second condition is satisfied.

A workflow may contain an operation to check a software version used by the server, compare the employed software version with the most recent version of the software, download the most recent software version if the employed version does not match the most recent version, and install the most recent software version if the employed version does not match the most recent version and if the most recent version downloaded successfully. In this example, the first condition may be whether the employed version of the software matches the most recent version of the software. In this example, the second condition may be whether the most recent software version downloaded successfully. A chain of conditional operations may also include additional operations and conditions.

In some cases, one or more workflows specify multiple alternative sequences of operations to be performed based on conditions present when the one or more workflows are processed. The multiple alternative sequences may be mutually exclusive. The computer or server that executes the workflow can determine which sequence of operations is appropriate when the workflow is run. The conditions for determining a sequence of operations to follow may be the same as the conditions for conditional operations. For example, these conditions may include the occurrence of an event, the nonoccurrence of an event, particular data being identified, particular data not being identified, particular data being matched, particular data not being matched, the time of day, the day of the week, the time of year, a status of a server, the load on a server reaching a threshold level, the security permissions of a user, etc. As an example, a workflow may have two alternative sequences of operations, a first sequence to be performed on weekdays and a second sequence to be performed on weekends. When the computer or server runs the workflow, the computer or server may make a determination as to whether it is a weekday or a weekend. If the computer or server determines that it is a weekday, the computer or server will provide for the first sequence of operations in the workflow to be run. Alternatively, if the computer or server determines that it is a weekend, the computer or server will provide for the second sequence of operations in the workflow to be run.

In some cases, one or more workflows specify operations that involve executing one or more scripts or executables. As an example, executables may include programs and certain files, e.g., files that are .BAT, .COM, .EXE, .BIN, .DMG, and/or .APP files. As an example, a script may include a series of commands within a file that is capable of being executed without being compiled. The scripts may include Python scripts, PHP scripts, JavaScript scripts, etc.

In some cases, one or more workflows specify operations that include shutting down or restarting a server environment. The operations may include a restart operation. The operations may include a shutdown operation. As an example, the operations for shutting down or restarting a server environment may be for shutting down or restarting one or more particular computers of the server environment.

In some cases, one or more workflows specify operations that involve accessing data from a data repository or data indicating operational characteristics of a data repository. As an example, a data repository may include a server, e.g. an on-premises server or a third-party server, or part of a server. As an example, a data repository may include a database. As an example, a data repository may include cloud storage that is provided by a cloud-computing platform. As an example, operational characteristics of the data repository may include log data for accesses to the data repository, a status of the data repository (e.g., an indication of whether or not it is experiencing an error or has recently experienced an error), a number of requests for data within the data repository, performance characteristics (e.g., an average time to process requests for data within with data repository, a maximum time, etc.), an indication of the specific data requested from the data repository, an indication of data added to the data repository, one or more dates and times associated with a request for data, one or more dates and times associated with data added to the data repository, etc.

In some cases, one or more workflows represent a template of operations to be customized for a particular server environment. For example, a workflow may include one or more fields that can be filed, customized, or modified. In this example, the one or more fields may be empty and may need to be filled in, e.g., by the user 124 using the user device 122. In this example, the one or more fields may have default values that are automatically set, e.g., by the workflow publishing server 110, or by are set by a user, e.g., the administrator 104 through the administrator device 102. As another example, one or more fields may be added to the workflow to, for example, add additional operations, further define operations, add conditions to operations, etc. The fields may correspond with an operation, with a condition for a conditional operation, with a condition for a particular sequence of operations, with multiple operations, etc. The fields may allow a user to, for example, specify a run time for the workflow, specify one or more server environment on which to run the workflow, add one or more operations, modify one or more existing operations, remove one or more existing operations, rearrange an order of the operations, set an order of the operations, set a hierarchy of the operations, divide the operations into multiple sequences of operations, assign one or more operations to a specific sequence of operations, remove one or more operations from a sequence of operations, etc.

In some cases, one or more workflows address specific errors or conditions of server environments, and have metadata indicating the errors or conditions they address. As an example, the specific errors or conditions may include the cache allocated to a server environment being full or approaching capacity (e.g., 70% full, 80% full, 90% full, etc.), poor performance of the server environment (e.g., unacceptable load times, render times, reporting times, etc.), a server environment crash, the amount of load on the server environment, hardware failure, etc. As an example, the metadata indicating the errors or conditions may include a purpose of the one or more workflows, an error that the one or more workflows address, a description of the operations within the one or more workflows. In addition, metadata such as security permissions may also provide some indication of the errors or conditions that the one or more workflows address.

The process 300 includes providing, to a computer system, catalog data identifying workflows, from among the multiple workflows, that are available to the computer system (304). The catalog data may include or be a workflow listing, e.g. workflow listings 114*a* or 114*b* as shown in FIG. 1. The catalog data may identify a set of workflows. The catalog data may contain one or more workflow libraries, e.g. workflow library 106 as shown in FIG. 1). The catalog data may be a workflow library. The catalog data may contain metadata that corresponds to one or more workflows. The metadata may include a name of the one or more workflows, a purpose of the one or more workflows or an error that the one or more workflows address, a description of the operations within the one or more workflows (e.g., which may also include required conditions for operation performance), a list of persons who can access the one or more workflows, security permissions for the one or more workflows, and software versions that the one or more workflows are compatible with. In some implementations, the identified workflows are those workflows that are compatible with the computer system. The computer system may be a server, a group of servers, a server system, or a server environment (e.g., the server 120 as shown in FIGS. 1A-1B). The computer system may be part of a cloud-computing service or environment.

In some cases, providing the catalog data includes publishing the catalog data to multiple systems. As an example, the multiple systems may include one or more server systems, server environments, computer systems, etc. For example, the multiple systems may include the server 120 and the server 130 shown in FIG. 1. As an example, the catalog data may be published over a public or private network such as the Internet.

In some cases, providing the catalog data includes pushing the catalog data to one or more systems. For example, the catalog data may be pushed by the workflow publishing server 110 shown in FIG. 1. As an example, the one or more systems may include one or more server systems, server environments, computer systems, etc. In this example, the one or more computer systems may include or be part of one or more server systems or server environments. For example, the one or more systems may include the server 120 and/or the server 130 shown in FIG. 1.

In some cases, the catalog data includes metadata associated with each of the workflows. The metadata may indicate software the associated workflow applies to, conditions the associated workflow applies to, permissions needed for the associated workflow, a description for the associated workflow, and/or an error addressed by the associated workflow. As an example, conditions that a workflow applies to or errors addressed by the workflow may include conditions or errors experienced by a server system or environment running the workflow. In this example, the conditions may include the cache allocated to a server environment being full or approaching capacity (e.g., 70% full, 80% full, 90% full, etc.), poor performance of the server system or environment (e.g., unacceptable load times, render times, reporting times, etc.), a server system or environment crash, the amount of load on the server system or environment, hardware failure, etc. As an example, the permissions needed for the associated workflow may include security permissions. In this example, security permissions may include a full control permission, a modify permission, a read and execute permission, a write permission, etc. As an example, a user of the server system or server environment may be assigned one or more permissions, e.g. by an administrator of the server system or server environment.

The metadata of the workflows may be used by the computer system in performing actions or in preventing actions from being performed. For example, the metadata associated with a workflow may be used by the computer system to prevent some users from running the workflow on the computer system if they do not have the requisite permission level as indicated by the metadata. As another example, the metadata indicating a software associated with a workflow may be used by the computer system to prevent the workflow from being run if the workflow is no longer compatible with the computer system, e.g. where the software on the computer system has been updated or upgraded since the workflow was downloaded from the workflow publishing server 110 shown in FIG. 1. Similarly, a user of the computer system may use the metadata indicating the software to ensure that the workflow is compatible. A user of the computer system may adjust or modify the metadata of a workflow. For example, a user may change the conditions, permissions, description, and/or error addressed of a particular workflow.

The process 300 includes receiving, from the computer system, a request for a workflow from among the workflows identified by the catalog data (306). The request may specifically name or otherwise identify one or more workflows from the workflows identified by the catalog data. In some implementations, the request does not specifically name or specifically identify one or more workflows. In these implementations, the request may contain a query. The query may include information naming or describing a specific error, condition, or other issue experienced by the computer system. The query information may be compared to metadata corresponding to the multiple workflows. In comparing the query information to the workflow metadata, the system (e.g., the system 100 as shown in FIGS. 1A-1B) or a part of the system (e.g., the workflow publishing server 110 as shown in FIGS. 1A-1B) may identify one or more workflows of the multiple workflows that specifically address the error, condition, or other issue experienced by the computer system, and/or one or more workflows that are related to the error, condition, or other issue experienced by the computer system. The system (e.g., the system 100 as shown in FIGS. 1A-1B) or a part of the system (e.g., the workflow publishing server 110 as shown in FIGS. 1A-1B) may leverage one or more machine learning in identifying the one or more workflows of the multiple workflows.

The process 300 includes sending, to the computer system, the requested workflow in response to the request (step 308). The requested workflow may be sent to the computer system over a network. The system (e.g., the system 100 as shown in FIGS. 1A-1B) or a part of the system (e.g., the workflow publishing server 110 as shown in FIGS. 1A-1B) may check to confirm that the workflow requested is compatible with the computer system before sending.

The process 300 optionally includes receiving a request for catalog data. In these cases, providing the catalog data includes providing the catalog data in response to receiving the request for catalog data. For example, the catalog data may be provided by the workflow publishing server 110 shown in FIG. 1 to the server 120 in response to a request for the catalog data being sent by the server 120 to the workflow publishing server 110. The request for the catalog data and the catalog data may be sent over a public or private network such as the internet.

The process 300 optionally includes identifying a configuration of the computer system, and providing a customized subset of the workflows based on the configuration of the computer system. As an example, the configuration of the computer system may include one or more characteristics of the computer system. As an example, the configuration of the computer system may indicate software installed on the computer system, versions of the software installed, configuration settings of the computer system, load levels experienced by the computer system, usage logs of the computer system, error logs of the computer system, and so on. As an example, in providing a customized subset of workflows, the workflow publishing server 110 shown in FIG. 1 can filter the workflows to identify those that are compatible with the configuration of the computer system, or are compatible with one or more characteristics of the configuration of the computer system.

In some cases, providing a customized subset of the identified workflows is based on a software version for software used by the computer system, a setting of the computer system, a usage pattern of the computer system, an error encountered by the computer system, and/or a limitation encountered by the computer system. For example, each workflow that is compatible with a first version of a particular software, e.g. version 2.1, may be placed in the subset, e.g. by the workflow publishing server 110 shown in FIG. 1. In this example, the first version of the software may be the version used by the computer system, e.g. a server, requesting the workflows.

As an example, settings may include configuration settings. In this example, all workflows that are compatible with the configuration settings may be placed in the subset. The configuration settings may correspond with the computer system. The configuration settings may include, for example, a cache size of the computer system, memory allocated to the computer system, processors allocated to the computer system, bandwidth of the computer system, software used by computer system, software versions used by the computer system, etc.

As an example, usage patterns may include operation patterns associated with users of the computer system. The usage patterns may be determined by the workflow publishing server 110 shown in FIG. 1 by, for example, leveraging one or more machine learning. The usage patterns may indicate, for example, operations frequently performed by users of the computer system, operations that are frequently performed together, operations that typically follow an earlier operation, operations are typically performed during a particular state of the computer system (e.g., particular date, particular time of the day, particular load level on the computer system or threshold load level being reached, etc.), etc.

As an example, errors encountered by the computer system may include the cache allocated to computer system being full or approaching capacity (e.g., 70% full, 80% full, 90% full, etc.), poor performance of the computer system (e.g., unacceptable load times, render times, reporting times, etc.), the computer system experiencing a crash, the amount of load on the computer system reaching a threshold level, hardware failure, etc. In determining whether the computer system has encountered an error, as an example, the workflow publishing server 110 may analyze error reports, error logs, and/or server manager logs of the computer system in order to identify errors encountered by the computer system. In analyzing error reports, error logs, and/or server manager logs, the workflow publishing server 110 may, for example, leverage one or more machine learning.

The process 300 optionally includes receiving information, from the computer system, indicating a log of actions performed by the computer system, determining a level of similarity of actions in the log with operations in a workflow of the multiple workflows, determining that the level of similarity satisfies a threshold; and providing, to the computer system, the workflow or a recommendation for the workflow based on determining that the level of similarity satisfies the threshold. As an example, the information may include usage logs or server manager logs. As an example, determining a level of similarity may include determining whether a first operation performed by the computer system is found in a workflow, determining whether one or more operations performed by the computer system before or after performing the first operation are also found in the workflow, determining whether the workflow includes any operations that are not performed by the computer system, determining whether the workflow does not include any operations that are performed by the computer system, determining whether the workflow does not include any operations within a subset of operations performed by the computer system (e.g., those operations surrounding the first operations, a group of operations that are frequently performed together on the computer system, etc.), determining if the conditions for an operation performed by the computer system are the same or similar to the conditions for performing a corresponding operation found in a workflow, etc. In determining a level of similarity, as an example, the workflow publishing server 110 shown in FIG. 1 may leverage one or more machine learning. The threshold may be set by a user. The threshold may be set to, for example, 60%, 70%, 80%, or 90% similarity.

The process 300 optionally includes receiving data, from the computer system, indicating errors or conditions of a server system, identifying one or more workflows of the multiple workflows that are configured to address the errors or conditions, and providing, to the computer system, the workflow or a recommendation for the workflow. As an example, the data may include usage logs, error reports, error logs, and/or server manager logs. In identifying one or more workflows, as an example, the workflow publishing server 110 may leverage one or more machine learning.

The process 300 optionally includes receiving a query from the computer system, determining a workflow of the multiple workflows based on the query, and providing, to the computer system, the workflow or a recommendation for the workflow in response to receiving the query. As an example, a query may be or include a request for a catalog of available workflows, a request for one or more identified workflows, a request for compatible or recommended workflows, etc. The query may include, for example, an indication of one or more specific workflows. The query may include, for example, one or more criteria for workflows that are to be used in identifying one or more workflows to be sent to the computer system in response. The query may include information corresponding with the computer system such as, for example, configuration settings of the computer system. In some cases, the query may be include a request for documents, e.g. from the workflow publishing server 110 shown in FIG. 1. In these cases, the workflow publishing server 110 may identify one or more workflows that correspond with the requested documents, and may send the identified one or more workflows to the computer system or may send a recommendation including an indication of the identified workflows to the computer system.

A computer system can provide an interface that enables a user to generate workflows using different types of information, which can be captured through multiple regions or interfaces of an application. These interfaces may allow for the creation or modification of a workflow in different ways. These interfaces may provide different features or functions that can be added to the workflow or used to otherwise modify the workflow. Once a workflow has been generated, it may be installed and run on a computer system. While running, the workflow may cause interactions with one or more other systems that are external with respect to the system. These systems may include, for example, databases, servers, repositories, remote systems, a centralized system, etc. While running, the workflow may be configured to perform some operations and actions automatically, but to request and require approval from a user before carrying out other operations.

By incorporating multiple interfaces that provide different ways to specify the workflow operations, the computer system allows one or more users to create or modify a workflow in different ways. This provides for quicker generation of workflows as users can leverage those interfaces of that multiple interfaces that are most/more efficient for the particular operations, conditions, or other workflow elements that are being added or modified. In addition, the multiple interfaces that provide different ways to specify the workflow operations have varying levels of sophistication. Accordingly, a wide range of users with varying skill sets can successfully use the computer system to create and/or modify a workflow. For example, a user who does not have the skill set to use a first interface of the multiple interfaces, likely has the skill set to use one or more of the other interfaces of the multiple interfaces. Thus, the user can still create or modify a workflow despite their lack of knowledge or experience with respect to the first interface.

Figure 4:
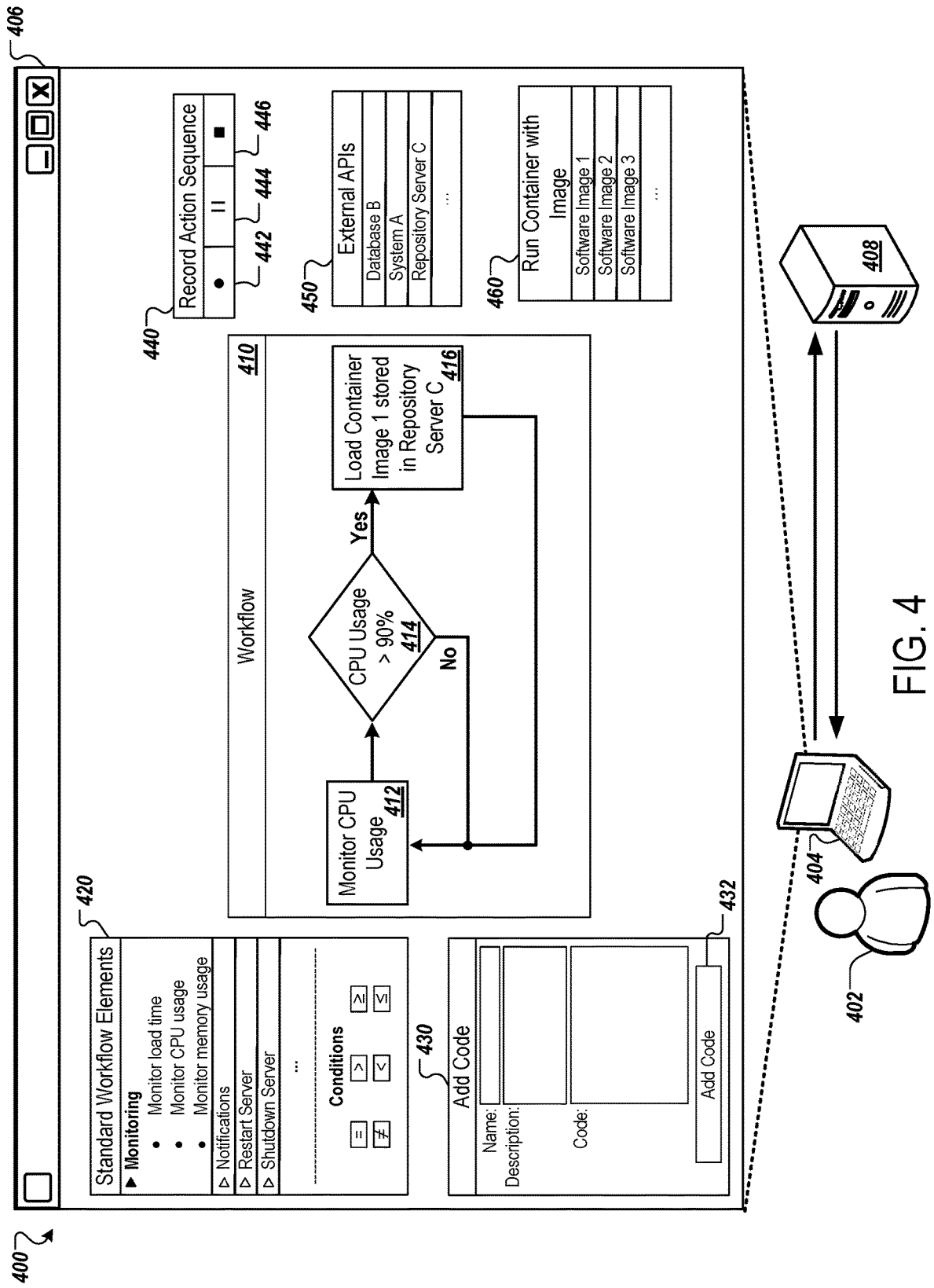
FIG. 4 is a diagram that illustrates example interfaces used to generate a workflow.

FIG. 4 depicts a diagram that illustrates multiple interfaces 420, 430, 440, 450, and 460 of a system 400 used to generate a workflow 410 in flexible and dynamic ways. The interfaces 420, 430, 440, 450, and 460 may be presented on one or more computing devices, such as one or more laptops, desktop computers, mobile phones, smart phones, tablet computers, etc. The interfaces 420, 430, 440, 450, and 460 can be collectively presented together on a single computing device. For example, the interfaces 420, 430, 440, 450, and 460 may be presented on a graphical user interface (GUI) of a computing device as part of a workflow generation or modification application that is run on the computing device. The GUI of the computing device may include a first interface area for generating or modifying a workflow (e.g., where the workflow 410 may be presented), a second interface area corresponding to the interface 420 (e.g., for selecting one or more predefined workflow elements), a third interface area corresponding to the interface 430 (e.g., for a development environment where one or more users may enter computer code), a fourth interface area corresponding to the interface 440 (e.g., for actions taken by one or more users to be recorded and converted into one or more workflow elements), a fifth interface area corresponding to the interface 450 (e.g., for permitting access to external resources external), and a sixth interface area corresponding to the interface 460 (e.g., for adding container functions).

Through the one or more of the interfaces 420, 430, 440, 450, or 460, the system 400 may add one or more workflow elements to the workflow 410, or may modify one or more existing workflow elements presently within the workflow 410. Each workflow element within the workflow 410 may represent a step of the workflow. A workflow element may be made conditional on the occurrence of an event, nonoccurrence of an event, on output being generated from a different workflow element, on the successful processing of an earlier workflow element (e.g., an earlier step within the workflow 410), values (e.g., those provided by an output of a workflow element) meeting or exceeding a threshold value, particular data being identified, particular data not being identified, particular data being matched, particular data not being matched, the time of day, the day of the week, the time of year, a status of a server, the load on a server reaching a threshold level, the security permissions of a user running the workflow 410, etc.

As shown, the system 400 includes a user device 404 and a workflow server 408. As will be described in more detail below with FIG. 5, the system 400 may also include one or more external systems.

A user device 404 can be a computing device, such as a desktop computer, a laptop computer, a mobile phone, a smart phone, a personal digital assistants (PDA), a tablet computer, or other computing devices. The user device 404 includes a GUI 406. The user device 404 may be accessed by a user 402.

The workflow server 408 may include one or more computing devices. As noted above, the workflow server 408 includes the workflow module 508. The server 408 may be on-premises or off-premises. The server 408 may be considered a third-party server. The server 408 may be part of a cloud computing platform (e.g., Amazon Web Services (AWS), Microsoft Azure, and so on).

The interface 420 provides for the selection of one or more predefined workflow elements. These workflow elements may include action or operation elements. That is, the predefined workflow elements of the interface 420 may include one or more actions or processes that a workflow can perform when run. The action or operation workflow elements may include one or more monitoring operations, notification or messaging operations, server system operations (e.g., stop, restart, or shutdown a server or a part of a server), etc. The predefined workflow elements may additionally include conditional elements that can be attached to an action or operation element, or to a workflow. For example, through the interface 420, the user 402 may select an element that adds a condition to the workflow 410 in order for the workflow 410 to be run. As another example, the user 402 may select an element corresponding to an action or operation and then select a second element corresponding to a condition. The system 400 may interpret the two selections that the action or process should only be performed when the condition is met based on, for example, the selections occurring contemporaneously with one another, the selection of the conditional element occurring immediately after the selection of the action or operation element, the selection of the conditional element occurring immediately after the selection of the action or operation element and the two selections occurring contemporaneously with one another, etc.

The interface 420 may be organized into different sections and/or hierarchies. For example, there may be a first section of the interface 420 that presents action or operation elements, and a second section of the interface 430 that presents conditional elements. The first section may be sub-divided into different categories based on a type of action or operation. As an example, the first section may be sub-divided into a monitoring sub-section, a notification sub-section, and a server system sub-section. Similarly, the second section may be sub-divided into different categories based on a type of condition. As an example, the second section may be sub-divided into a conditional operator sub-section (e.g., includes elements for equal to, greater than, less than, greater than or equal to, less than or equal to, etc.) and logical operator sub-section (e.g., includes elements for logical AND, OR, NOT, NAND, NOR, EX-OR, and EX-NOR).

As shown, the interface 420 includes a first section corresponding to action or operation workflow elements. The first section includes a monitoring sub-section, a notifications sub-section, a restart server sub-section, and a shutdown server sub-section. As shown, the monitoring sub-section has been selected, e.g., by the user 402. Within the expanded monitoring sub-section are three workflow elements including a first workflow element to monitor load time, a second workflow element for monitoring CPU usage, and a third workflow element for monitoring memory usage. If the user 402 were to select the notifications sub-section, the system 400 may present the user 402 with a list of workflow elements including, for example, an email, a dashboard notification, a text notification, an automated phone call, etc. If the user 402 were to select the restart server sub-section, the system 400 may present the user 402 with a list of workflow elements including, for example, restarting a local server, restarting a remote server, restarting the entire server, restarting a portion of the server (e.g., such as a server environment running in the server), etc. Similarly, if the user 402 were to select the shutdown server sub-section the system 400 may present the user 402 with a list of workflow elements including, for example, shutdown a local server, shutdown a remote server, shutdown the entire server, shutdown a portion of the server (e.g., such as a server environment running in the server), etc.

As shown, the interface 420 includes a single conditional element section. The conditional elements within this section include an equals operator, a greater than operator, a greater than or equal to operator, a less than operator, a less than or equal to operator, and a not equals to operator.

The predefined workflow elements presented in the interface 420 may be automatically added to the workflow 410 by the system 400 when the system 400 detects one or more inputs. For example, an element may be added to the workflow 410 by the system 400 when the system 400 detects a mouse click of the element, a mouse double click of the element, a touch input of the element, a touch gesture identifying the element, a voice command identifying the element, a drag-and-drop of the element into a workflow area of a GUI of a computing device, keyboard input(s), etc. When a new element is being added to the workflow, the system 400 may perform an action with an existing element—e.g., combine the new and existing element, place the new element immediately before the existing element, place the new element immediately after the existing element, replace the existing element with the new element, etc.— based on what the new element is (e.g., condition or action/operation), what the existing element is (e.g., condition or action/operation), and/or how the new element is added. For example, by the user 402 dragging a condition element into the workflow area corresponding to the workflow 410 and dropping it onto an existing action element, the system 400 may combine the elements by adding the condition to the action within the workflow.

As shown, the user 402 may have selected the monitor CPU usage element from the interface 420. In response, the system 400 may have automatically added element 412 to the workflow 410. The system 400 may have automatically placed the element 412 in the starting or first position based on, for example, the monitor CPU usage element being the first element that was selected during the process of generating the workflow 410, or based on input from the user 402 indicating that the monitor CPU usage element should be placed or positioned first within the workflow 410.

When the user 402 selects an element from the interface 420 to be added to the workflow 410, the system 400 may request additional information from the user 402. For example, the system 400 may request that the user 402 specify a particular server that the selected element should be performed with or on, a particular server environment that the selected element should be performed with or on, a position for the selected element within the workflow 410, a duration to be associated with the selected element in the case of an action/operation element being selected, a time period to be associated with the selected element in the case of an action/operation element being selected, a frequency to be associated with the selected element in the case of an action/operation element being selected, an existing action/operation element in the case of a conditional element being selected, one or more values in the case of a conditional element being selected (e.g., where the one or more values may include fixed values, percentages, variables, etc.), etc. For example, if the user 402 were to select the greater than conditional element from the interface 420, the system 400 may automatically request that the user 402 select an action/operation element existing within the workflow 410, and/or a value that the conditional element should be compared against. In response to these requests, the user 402 may have selected the element 412 and may have entered a value of 90%. Based on these inputs, the system 400 may have automatically generated the element 414 which provides that a determination be made as to whether the CPU usage is greater than 90% of the maximum CPU usage.

In some implementations, the user 402 may be able to customize the interface 420. For example, the user 402 may be able to add one or more additional workflow elements to the interface 420. The user 402 may be able to add one or more workflow elements within the interface 420 to a preferred list of workflow elements. Alternatively or additionally, the system 400 can generate a list of workflow elements that are frequently used and/or have been recently used (e.g., last week, last month, last year, etc.) collectively or by the user 402, and can present the list to the user 402 through the interface 420.

The interface 430 provides for a development environment where one or more users may enter computer code. Through the interface 430, the user 402 may generate a custom executable such as a script. The system 400 may integrate executable code entered through the interface 430 into the workflow 410 as one or more workflow elements, such as one or more action/operation workflow elements, and/or one or more conditional workflow elements. Additionally or alternatively, the system 400 may integrate executable code entered through the interface 430 into the workflow 410 as a modification to one or more existing elements.

The interface 430 may allow the user 402 to add additional information that is to be associated with the executable code. This additional information may include metadata that is stored with the executable code. The metadata may include a name or title for the executable code, a description for the executable code, a permission level required to run the executable code, etc. This additional information may also include an indication of the type of code being entered. For example, the user 402 may select a type of code (e.g., a programming language) from a drop-down menu 432. As shown, the user 402 has selected a code type of "Python" from the drop-down menu 432.

The executable code may be automatically added to the workflow 410 as one or more workflow elements (or as a modification to one or more workflow elements) by the system 400 when the system 400 detects one or more inputs. For example, the code may be added to the workflow 410 by the system 400 when the system 400 detects a mouse click of the button 434, a mouse double click of the button 434, a touch input of the button 434, a touch gesture indicating that the executable code should be added, a voice command indicating that the executable code should be added, a drag-and-drop of the executable code into a workflow area of a GUI of a computing device, keyboard input(s), etc. In adding the executable code to the workflow 410, the system 400 may convert the executable code into one or more workflow elements. In converting the executable code into one or more workflow elements, the system 400 may use a code type provided by the user 402, e.g., through the drop-down menu 432. In some implementations, the system 400 may automatically determine a code type for the code entered through the interface 430, e.g., based on the entered code, based on the format of the entered code, and/or using a programming language classifier.

When the user 402 indicates that executable code entered through the interface 430 should be added to the workflow 410, the system 400 may request additional information from the user 402. For example, the system 400 may request that the user 402 specify a particular server that the executable code should be performed with or on, a particular server environment that the executable code should be performed with or on, a position for the element corresponding to the executable code within the workflow 410, one or more existing elements in the workflow 410 that the executable code is to be performed with or that the executable code modifies, etc.

The executable code and/or the one or more resulting workflow elements can leverage the full context of the workflow 410. For example, the executable code and/or the one or more resulting workflow elements may be able to use one or more APIs that have been added to the workflow 410, data that has been accessed, retrieved, and/or loaded by the workflow 410 (e.g., by one or more other workflow elements within the workflow 410 when the workflow 410 is run), etc. By leveraging the context of the workflow 410, the executable code and/or the one or more resulting workflow elements may be able to interact with or modify one or more data objects, and/or one or more systems including external systems. For example, the executable code and/or the one or more resulting workflow elements could leverage an API of the workflow 410 in order to query an analytics platform on an external analytics system.

One benefit of the interface 430 is that it can reduce the size and/or complexity of the interface 420. For example, instead of providing a large number of predefined workflow elements that a user is unlikely to include in the workflow 410, the user 402 can instead use the interface 430 to enter custom executable code for those operations and/or conditions that are more complicated and/or less frequent needed. For example, a workflow being created or modified may include a workflow element that queries a first system (e.g., platform analytics system) to retrieve a list of users that have not accessed the first system within a specified time period (e.g., past week, past month, past year, etc.). The user 402 could enter their own code through the interface 430 that provides for treating two specified users (e.g., who may appear within the list of users) differently than the rest of the users. A workflow element of the workflow may provide for automatically revoking the access rights of users appearing in the list of users, e.g., those users that have not recently accessed the first system. The executable code added to the workflow (e.g., by the user dragging and dropping the executable code onto the workflow element that provides for automatically removing users) can modify the workflow element that provides for automatically removing users such that the workflow element will ignore the two specified users and/or remove them from the list. The executable code may also provide for the creation of a notification workflow element within the workflow such that if the one or both of the specified users are identified in the list of users, they will be notified that they have not recently used the first system and/or that, unless they use the first system, they will soon have their the access rights revoked.

In some implementations, the user 402 may be able to indicate whether they would like the one or more workflow elements resulting from the executable code to be added to the interface 420 as predefined workflow elements. The system 400 may prompt the user 402 to provide such an indication upon determining that the executable code entered through the interface 430 should be added to the workflow 410. If the user 402 indicates that the resulting workflow elements should be added, the system 400 may automatically add the resulting workflow elements into the interface 420. The system 400 may place the resulting workflow elements into the interface 420 (e.g., within particular sections, sub-sections, or categories) based on metadata associated with the corresponding executable code, based on the executable code itself, and/or based on other user input.

In some implementations, the system 400 automatically adds the resulting one or more workflow elements to the interface 420 as predefined workflow elements upon determining that the executable code entered through the interface 430 should be added to the workflow 410. The system 400 may place the resulting workflow elements into the interface 420 (e.g., within particular sections, sub-sections, or categories) based on metadata associated with the corresponding executable code, based on the executable code itself, and/or based on other user input.

The interface 440 provides for actions taken by one or more users to be recorded and converted into one or more workflow elements by the system 400. Through the interface 440, the user 402 may indicate that their actions should be recorded (e.g., by selecting the recording button 442). In response, the system 400 may start to record all actions taken by the user 402 or by one or more different users with respect to the system 400 or a different system (e.g., an external system with respect to the system 400, such as a centralized management system). The actions recorded may include, for example, all setting changes made to the system 400 (or to external systems), all system processes initiated by the user 402 on the system 400 (e.g., commands), all external systems accessed by the user 402, etc. The system 400 may suspend recording user actions when the system 400 detects input indicating that the recording should be paused (e.g., by the user 402 selecting the pause button 444). The system 400 may resume recording user actions when the system 400 detects input indicating that the recording should be resumed (e.g., by the user 402 selecting the recording button 442 for a second time). When the system 400 detects input indicating that recording user actions should be stopped (e.g., by the user 402 selecting the stop button 446), the system 400 may stop recording user actions, thereby ending the recorded action sequence. The system 400 may then convert the action sequence into one or more workflow elements and add the generated elements to the workflow 410.

The system 400 may automatically being recording the action sequence of one or more users when the system 400 detects one or more inputs. For example, the system 400 may start recording when it detects a mouse click of the recording button 442, a mouse double click of the recording button 434, a touch input of the recording button 434, a touch gesture indicating that user actions should be recorded, a voice command indicating that user actions should be recorded, keyboard input(s), etc.

The action sequence may be automatically converted and the resulting workflow element(s) automatically added to the workflow 410 by the system 400 when the system 400 detects one or more inputs or determines that a predetermined amount of time has allotted since the action sequence was initiated. For example, the system 400 may automatically convert the action sequence and add the resulting workflow element(s) when the system 400 detects a mouse click of the stop button 446, a mouse double click of stop button 446, a touch input of the stop button 446, a touch gesture indicating that user actions should stop being recorded, a voice command indicating that user actions should stop being recorded, keyboard input(s), etc. As another example, the system 400 may automatically convert the action sequence and add the resulting workflow element(s) when the system 400 determines that a predetermined amount of time has passed since the recording was initiated. The predetermined amount may have been entered by the user 402 prior to initiating recording of the action sequence, or at the time the recording of the action sequence is started. At the start of recording, the system 400 may prompt the user 402 to indicate whether they wish to provide a time duration for recording actions, and/or prompt the user 402 to provide a time duration that they wish to have their actions recorded for.

One of the benefits of the interface 440 is that the amount of information that a user may need to enter and/or that the system 400 may request from the user is reduced when compared to workflow elements added to the workflow 410 through other interfaces. For example, the user 402 may not need to provide information as to which systems, servers, or server environments that a particular action or operation is to be performed on or with as this information can be recorded as part of the action sequence. However, the system 400 may still request some information at the start of recording or at the end of recording. For example, the system 400 may request that the user 402 enter metadata (e.g., a name or title, description, permission level, etc.) to be associated (e.g., stored with) the recorded action sequence. As another example, the system 400 may request that the user 402 indicate a position within the workflow 410 that the workflow elements resulting from the action sequence should be placed.

However, the system 400 may automatically choose a position within the workflow 410 for the resulting elements to be placed (e.g., in the order in which workflow elements were added to the workflow 410 and the order in which actions occurred within the recorded action sequence), may place the resulting workflow elements in the workflow 410 without a position with respect to existing workflow elements, or may place each of the resulting workflow elements in the workflow 410 without a position with respect to existing workflow elements and with each other. For example, the system 400 may add the one or more generated workflow elements into the workflow 410 after any preexisting elements such that the one or more generate workflow elements would be performed after the preexisting elements when the workflow is run. Where the system 400 generates multiple workflow elements from the recorded action sequence, the system 400 may organize the generated workflow elements in a particular order and/or hierarchy based on when actions occurred within the recorded action sequence. For example, where the system 400 records the user 402 performing two or more operations, the system 400 may generate a first workflow element corresponding to the operation that occurred first and may generate a second workflow element corresponding to the operation the occurred immediately after the first operation. Additionally, the system 400 may connect the two generated workflow elements such that the first workflow element is placed prior to the second workflow element. Thereby, performance of the second workflow element is made conditional on the performance of the first workflow element.

The interface 450 provides for permitting access to resources external with respect to the system 400. Specifically, the interface 450 may provide for the addition of one or more APIs to the workflow 410. The APIs may allow the workflow 410, e.g., through the system 400 or through another system on which the workflow 410 is run, to access one or more external servers, databases, repositories, or systems when the workflow 410 is run. An API selected through the interface 450 and added to the workflow 410 may be made available for use by all workflow elements within the workflow 410. However, in some implementations, an API may be associated with a particular workflow element and, thereby, made available only to that particular workflow element.

The system 400 may add a particular API to the workflow 410 (or to a particular workflow element within the workflow 410) in response to detecting one or more inputs indicating that an API has been selected. For example, the system 400 may add a particular API to the workflow 410 (or to a particular workflow element within the workflow 410) in response to detecting a mouse click of an API, a mouse double click of an API, a touch input of an API, a touch gesture indicating that a particular API should be added, a voice command indicating that a particular API should be added, a drag-and-drop of an API into a workflow area of a GUI of a computing device, a drag-and-drop of an API into a workflow area of a GUI of a computing device and onto an existing workflow element, keyboard input(s), etc.

As will be discussed in more detail below, when a workflow element is added to the workflow 410 that requires a particular API, the system 400 may automatically add the API to the workflow 410. In these cases, the system 400 may notify the user 402 that the API was added. Alternatively, when a workflow element is added to the workflow 410 that requires a particular API, the system can generate a recommendation that the API be added to the workflow, and notify the user 402 of the recommendation.

The system may proceed to automatically associate the API with the corresponding workflow element that required the API.

The interface 460 provides for adding container functions, such as starting, loading, or ending a container, to the workflow 410. For example, through the interface 460, the user 402 may select a software image from among a list of available software images. Upon detecting a selection of a software image from among the list of available software images, the system 400 may generate a corresponding workflow element and automatically add it to the workflow 410. The resulting workflow element may provide that the software image is to be loaded and that an instance of the software image should be run, thereby producing a corresponding container. As another example, through the interface 460, the user 402 may select one or more actions that can be taken with respect to one or more containers. Based off of these one or more selections, the system 400 may generate one or more corresponding workflow elements or may modify one or more existing elements within the workflow 410. As an example, through the interface 460, the user 402 can select an action to end all running containers, to reload a software image of a container, to change the configuration settings of a container, to change the data accessible to a container, etc. However, in some implementations, such actions may be included as part of the pre-defined actions or operations within the interface 420.

In general, a software image may refer to a snapshot, or template, from which new containers can be started. The software image can be a serialized copy of the entire state of an application or service stored in a non-volatile form, such as one or more files. Software images for containers of container-based environments generally exclude the operating system, but include the application or service, as well as supporting code libraries, dependencies, data sets, and so on that allow the application or service to run on an operating system of a host. The elements of the software image can be configured in a particular state. This package, the software image, is then executable as a container on the operating system of a host system, e.g., a cluster of processing nodes.

In serving as a snapshot or template, a single software image can be used to deploy multiple containers, with each container running a different instance of the same software image. A software image may include all of the components necessary for running a container, e.g., running an independent instance of the application or service for which the software is stored in the software image. These various components may include, for example, dependencies such as libraries and/or tools, code, a configuration file, one or more drivers, and/or settings. The software image may also contain references, pointers, or links to objects such as files outside of the software image and/or the corresponding container. Software images often define an internal file system structure, e.g., with various files organized in folders or directories, so that components of the software image can reference and access each other in a predictable manner. A software image may be composed of a set of read-only layers. A software image may be modified, for example, by adding a new layer to the set of read-only layers. A software image may be associated with a particular application or function. Similarly, the components of a software image may be associated with a particular application or function.

In general, a container may refer to an encapsulated environment in which applications or functions, e.g., services, are run. A container is defined by a software image and by a configuration file. A container is an instance of a software image and has access to the components of the software image.

Software images or container actions may be added to the workflow 410 as one or more workflow elements (or as a modification to one or more workflow elements) by the system 400 when the system 400 detects one or more inputs. For example, the software images or container actions may be added to the workflow 410 by the system 400 when the system 400 detects a mouse click of a corresponding software image or action, a mouse double click of a corresponding software image or action, a touch input of a corresponding software image or action, a touch gesture indicating that a software image or container action should be added, a voice command indicating that a software image or container action should be added, a drag-and-drop of a corresponding software image or action into a workflow area of a GUI of a computing device, keyboard input(s), etc.

When a user indicates that a software image or container action should be added to the workflow 410, the system 400 may request additional information from the user. For example, the system 400 may request that the user 402 specify a position for the resulting element(s) within the workflow 410. However, the system 400 may automatically choose a position within the workflow 410 for the resulting element(s) to be placed (e.g., in the order in which workflow elements were added to the workflow 410), or may place the resulting workflow element(s) in the workflow 410 without a position with respect to existing workflow elements.

As shown the user 402 may have dragged the "Software Image 1" from the interface 460 into the workflow 410, resulting in the system 400 generating the element 416. As will be discussed in more detail below, because the Software Image 1 happens to be stored in the Repository Server C, the system 400 may automatically integrate an API for the Repository Server C into the element 416, or may generate a recommendation to integrate the API and notify the user 402.

Once all of the workflow elements have been added to the workflow 410, a user may be able to organize the workflow elements. For example, the user 402 may be able to organize the workflow elements within a workflow area of a GUI of a computing device by, for example, connecting one or more of the workflow elements together, disconnecting two or more workflow elements (e.g., that may have been automatically connected by the system 400), indicating a workflow element that the workflow should process first when run, changing the position of one or more workflow elements, etc.

As shown, the user 402 may have connected an output of the element 412 with the input of the element 414. Alternatively, the system 400 may have automatically connected the output of the element 412 with the input of the element 414 based on the two elements being related (e.g., both related to CPU usage), based on the user 402 indicating that the element 414 should be added to the workflow 410 immediately after indicating that the element 412 should be added to the workflow 410, etc. The user 402 may have connected a first output of the element 414, corresponding to when the condition of the CPU usage is greater than 90% is met, to the input of the element 416.

Alternatively, the system 400 may have automatically connected the first output of the element 414 to the input of the element 416 using the methods described above. The user 402 may have connected a second output of the element 414, corresponding to when the condition of the CPU usage is greater than 90% is not met, to the input of the element 412. Alternatively, the system 400 may have automatically connected the second output of the element 414 to the input of the element 412 using the methods described above. The user 402 may have connected an output of the element 416 to the input of the element 412. Alternatively, the system 400 may have automatically connected the output of the element 416 to the input of the element 412 using the methods described above.

A user may also be able to further modify the workflow 410 or the elements within the workflow 410. For example, the user 402 can delete one or more workflow elements, modifying one or more workflow elements (e.g., to add conditions, APIs, etc.), etc.

As will be discussed in more detail below, when a user has finished modifying the workflow 410, they may indicate that the workflow 410 should be published. Upon detecting this indication, the system 400 may automatically send the workflow to the workflow server 408 to run the workflow 410. The system 400 may prompt the user 402 to indicate the specific server or server environment (e.g., the server 408) where the workflow 410 is to be sent.

In some implementations, the system 400 may recommend one or more workflow elements to be added, or may automatically add one or more workflow elements. For example, the system 400 may recommend a workflow element for the user 402 to select—or may automatically add a workflow element—based on the workflow element(s) that have already been selected or added to the workflow 410, and based on workflow elements that are frequently used together (e.g., by the particular user generating the workflow 410, by the users of the system 400 collectively, by the particular user generating the workflow 410 within the past week or month, by the users of the system 400 collectively within the past week or month, for the particular server or system that the workflow 410 is going to be run on, for the particular servers or systems that the workflow 410 is going to interact with as indicated by the selected APIs or as otherwise indicated, etc.). In determining one or more workflows to recommend, the system 400 may access a listing of workflows that are commonly used together, or may make a determination as to which workflows are commonly used together by analyzing one or more previously generated workflows (e.g., that were generated by the current user, for the system or server that the workflow 410 is going to be run on, for the systems or servers that the workflow 410 is going to interact with, etc.

The system 400 may also recommend a workflow element for a user to select—or may automatically add a workflow element—based on the workflow element being necessary for the workflow 410 to function. For example, if the user 402 were to specify that element 412 corresponds to the external System A such that when the workflow 410 is run, the workflow 410 monitors the CPU usage on the System A, then the system 400 may automatically add the external API for the System A to the workflow 410. The API for the System A may be integrated into the element 412.

In some implementations, one or more of the interfaces 420, 450, and 460 may incorporate a search feature that allows the user 402 to search through them for particular workflow elements, APIs, or software images (or container actions), respectively.

In some implementations, the system 400 allows one or more users to create a new workflow and/or modify an existing workflow through the interfaces 420, 430, 440, 450, and/or 460.

Figure 5:
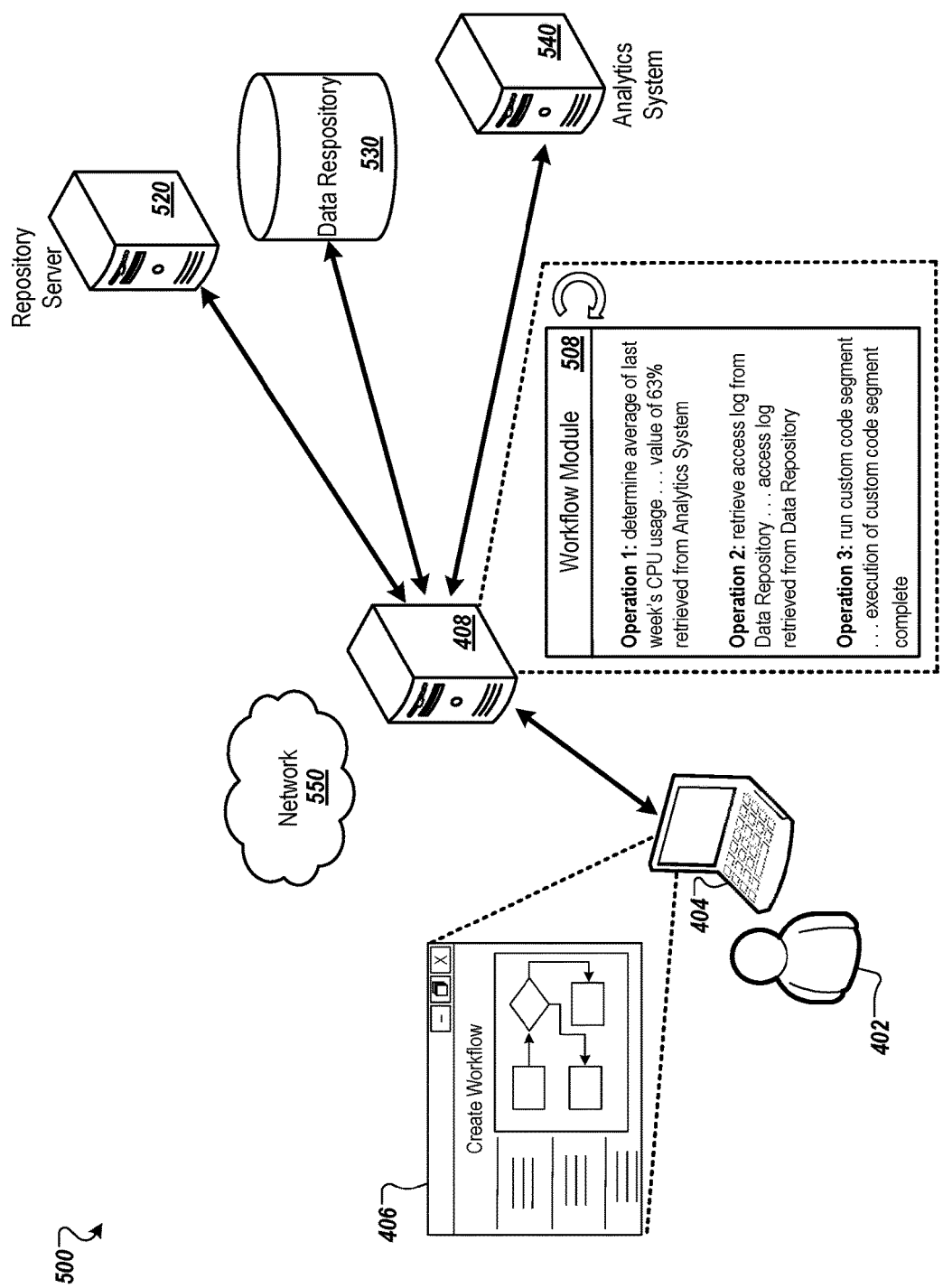
FIG. 5 is a diagram that illustrates an example system for processing a generated workflow.

FIG. 5 is diagrams that illustrates an example system 500 for processing a generated workflow. The system 500 includes the user device 404 and the workflow server 408. The system 500 can also include one or more external systems such as a repository server 520, a database 530, and an analytics system 540. The workflow server 408 is configured to process one or more generated workflows using a workflow module 508. The workflow server 408 is also configured to communicate with the user device 404 and the one or more external systems over a network 550. In some implementations, the system 500 is the system 400 shown in FIG. 4.

The user device 404 can communicate with the server 408 over, for example, the network 550. The network 550 can include public and/or private networks and can include the Internet.

The repository server 520 may include one or more computing devices. The repository server 520 may include a repository of data objects such as, for example, software images that can be loaded and run as a container. The server 520 is remote with respect to the workflow server 408. The server 520 may be considered a third-party server. The server 520 may be part of a cloud computing platform (e.g., Amazon Web Services (AWS), Microsoft Azure, and so on). The workflow server 408 may communicate with the server 520 through a particular API.

The database 530 may include memory, such as non-volatile memory. The database 530 is remote with respect to the workflow server 408. The database 530 may be part of a server, such as a third-party server. The database 530 may be part of a cloud computing platform (e.g., Amazon Web Services (AWS), Microsoft Azure, and so on). The workflow server 408 may communicate with the database 530 through a particular API.

The analytics system 540 may contain one or more computing devices. The analytics system 540 can be configured to provide analytical functions with respect to received data. For example, the analytics system 540 may be able to provide statistics, progressions, various visualizations given input data. The analytics system 540 is remote with respect to the workflow server 408. The analytics system 540 may be considered or be part of a third-party server. The analytics system 540 may be part of a cloud computing platform (e.g., Amazon Web Services (AWS), Microsoft Azure, and so on). The workflow server 408 may communicate with analytics system 540 through a particular API.

Through the system 500, a user 402 can create, install, and run a workflow that was generated through multiple interfaces. Specifically, a user may be able to create a new workflow or modify an existing workflow through the user device 404. The user device 404 may have access to multiple interfaces through which the user 402 may be able to provide input. These multiple interfaces may be presented on a GUI 406 of the user device 404. Depending on the input provided by the user 402 and the interface used to provide that input, different workflow elements may be added to or modified within a workflow.

When a user has finished creating or modifying a workflow through the user device 404, they may indicate that the workflow should be published. Upon detecting this indication, the system 500 (e.g., the user device 404) may automatically send the workflow to the workflow server 408. The user 402 may have specified the workflow server 408 as the destination for the generated workflow and/or may have been prompted by the system 500 (e.g., the user device 404) to provide a destination.

Upon receiving the generated workflow, the workflow server 408 may provide the workflow to its workflow module 508. The workflow module 508 is configured to run the generated workflow. As described in FIG. 4, the generated workflow may incorporate one or more APIs in order to interact with external systems. Accordingly, if the generated workflow includes actions or operations that call for interacting with the repository server 520, the workflow server 408 may use an API within the generated workflow for the repository server 520 to communicate with the repository server 520, to access data objects such as software images from the repository server 520, etc. Similarly, if the generated workflow includes actions or operations that call for interacting with the database 530, the workflow server 408 may use an API within the generated workflow for the database 530 to communicate with the database 530, to access data within the database 530, etc. If the generated workflow includes actions or operations that call for interacting with the analytics system 540, the workflow server 408 may use an API within the generated workflow for the analytics system 540 to communicate with the analytics system 540, to provide data to the analytics system 540, to retrieve reports (e.g., statistics, progressions, etc.) from the analytics system 540, etc.

The workflow module 508 may process multiple workflows concurrently or consecutively. In some implementations, the workflow module 508 waits to process a generated workflow until a triggering event occurs. In these cases, the workflow module 508 may monitor for the triggering event. The triggering event may be defined by a conditional element that was added to the workflow while being created or modified. The workflow module 508 may reprocess a previously processed workflow. For example, once a workflow has been processed, the workflow module 508 may place it back in a processing queue. However, if the generated workflow requires a triggering event, the workflow module 508 may monitor for the triggering event while processing other workflows.

Figure 6:
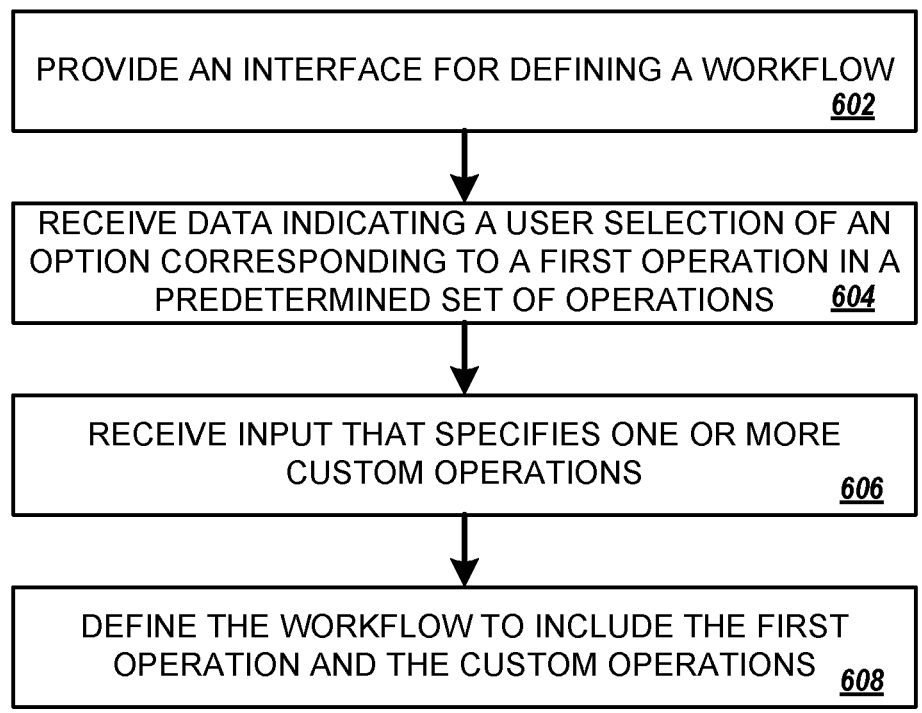
FIG. 6 is a flow chart that illustrates a process for generating a workflow.

FIG. 6 is a flow chart that illustrates a process 600 for generating a workflow. The process can be performed by one or more computers, such as the user device 404 and/or the workflow server 408.

The process 600 includes providing an interface for defining a workflow having one or more operations for a computer system to perform (602). The interface provides options that are selectable to cause an operation from a predetermined set of operations to be added to the workflow. The predetermined set of operations can be elements in a library or collection that are available to use in building a workflow. The elements may be simple operations (e.g., read, write, execute, update, compare, etc.) or may be more complex elements including combinations of multiple operations. The predetermined set of operations can include predetermined programming blocks, modules, templates, widgets, functions, equations, or other elements available to be added to a workflow. The interface can be a user interface, such as an interface of an application, a web page, a web application, and so on. In other examples, the interface can be an application programming interface (API), a voice response user interface, or other interface.

In some cases, the interface provides elements that a user can select from a list, panel, drop-down box, or other control. The selection can cause the selected element to be added to another panel or area of the user interface for designing a sequence of operations to be performed when the workflow is run. For example, the interface can enable a user to drag an element from one area of the interface, such as a panel showing a library of operations or elements, and drop the element into another area, such as a workspace or workflow display area to show a series of operations of the workflow. The interface can include an area for predefined operations and conditions, wherein the area for predefined operations and conditions includes (i) interface elements that specify operations and are selectable to include the operations in the workflow and (ii) interface elements that specify conditions and are selectable to apply the conditions to the workflow, or more specifically, to elements or groups of elements in the workflow.

The workspace can include controls and interactions so that the user can move and re-arrange visual elements (e.g., blocks, icons, boxes, etc.) into a desired sequence. For example, the user can arrange the elements into a flowchart-like combination. Not only can the user can specify the order of elements (e.g., representing operations such as data retrieval, comparisons, testing, determinations, reading or changing configuration settings, etc.), the interface can enable the user to specify which elements depend on which other elements, which elements receive input from or provide output to other elements, and so on. This permits the workspace to visually design and adjust the flow of operations for the workflow, including with conditional branches, different paths or results based on results of calculations, and so on. These features allow the workflows that users generate to respond to different situations and different contexts in different ways.

For example, the interface can provide basic elements representing obtaining a performance measure for a computer system (e.g., a server), comparing a value to a threshold, sending a message, and changing a setting. A user can select these elements, such as by dragging them into a workspace region of the user interface, and then move them into a desired order and specify the relationships among them, as well as to customize the parameters of the individual elements. One example is a chain of operations such as obtaining an average load time, comparing the average load time to different threshold values specified by the user, and then take different actions based on the comparison results (e.g., if the load time is in a first range then do nothing, if the load time is in a second range then change a particular value for a configuration setting, if the load time is in a third range then send an alert to an administrator, etc.).

The process 600 includes receiving data indicating user selection of an option of the interface corresponding to a first operation in the predetermined set of operations (604). For example, the system can receive data indicating an interaction with a user interface element corresponding to a particular operation of the particular operations. The data may indicates at least one of a mouse click event, a mouse double-click event, a drag-and-drop event, a touch event, a touch gesture event (e.g., tap, swipe, hold, or other touchscreen input), a voice command event, or one or more keyboard key events.

The process 600 includes receiving, through the interface, input that specifies one or more custom operations (606). In addition to specifying existing elements (e.g., from prior workflows or from a standard library of elements) to include in the workflow being designed, the interface can enable a user to customize element or define new elements. The interface can include a development environment area configured to receive programming code to specify one or more operations to be included in the workflow. This can enable a user to define new operations and use custom programming code to specify features of the workflow. For example, the system can receive programming code entered by a user into the development environment area. In response to receiving the programming code entered by the user, the system can (i) generate an interface element representing the programming code entered into the development environment area and (2) place the new interface element in the workflow display area to indicate the inclusion of the programming code in the workflow.

The process 600 includes defining the workflow to include (i) the first operation based on the data indicating the user selection and (ii) a second operation specified by the code (608). The workflow can be defined to include the particular operation(s) corresponding to the user interface element(s) that a user selected. In addition, operations can be indicated in a sequence or with the relationships and parameters (e.g., thresholds, ranges, data types, settings values, etc.) that a user specified through the interface.

Once the workflow is defined, the system can package the workflow as a workflow module that can be invoked based on a schedule or based on conditions or triggers that the user specifies. For example, a performance monitoring workflow may be set to run each hour to examine a server's logs over the last hour. As another example, a workflow for applying a software patch may be distributed to various different computer systems to be able to test the need for the patch, download the patch, install the patch, vary which elements are installed based on dependencies needed or other software present, etc. The workflow may be uploaded to a workflow publishing server 110, entered into a set of workflow libraries 114, and then distributed to other computer systems as discussed above.

In some cases, the system enables a user to record a series of user actions that the user can perform using a different interface. For example, a user can use a control to begin recording of user-initiated actions, perform operations (e.g., configuration changes, file access, data collection, etc.), and then use the control to end the recording. The system tracks and records the operations performed, and the interface is configured to add the recorded user-initiated actions as operations of the workflow. This way, when the completed workflow module is run, the set of user-initiated actions can be repeated each time.

The interface can enable the use or analysis of software images and containers. For example, the system can provide a container area that includes one or more interface elements specifying one or more software images or container-related operations (e.g., load or start a container running, stop or suspend a container, resume a suspended container, unload or remove a container, create a new image, run a command in a running container, etc.). In response to receiving the data indicating the interaction with the interface element specifying a software image or a container-related operation, the system can (i) generate an new interface element representing the software image or container-related operation corresponding to the interface element interacted with, and (ii) place the new interface element in the workflow display area to indicate the inclusion in the workflow of an operation involving running the software image in a container or other container-related operation. A user may specify container-related operations through command line commands, programming code, script files, or other techniques.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
    providing, by the one or more computers, an interface for defining a workflow, wherein the interface provides first interface elements that are selectable to cause an operation from a predetermined set of operations to be added to the workflow, wherein the interface provides second interface elements that are selectable to cause a monitoring operation to be added to the workflow, and wherein the interface provides third interface elements that are selectable to make the operations in the workflow performed selectively based on occurrence of an event or condition in which a result of the monitoring operation satisfies one or more criteria, wherein the one or more criteria include one or more predetermined sets of criteria;
    receiving first data indicating a user selection, from among the first interface elements, of an interface element corresponding to a first operation in the predetermined set of operations;
    receiving second data indicating a second user selection, from among the second interface elements, of a second interface element corresponding to a second operation of monitoring a status of a computer system;
    receiving third data indicating user interaction with one or more of the third interface elements, wherein the user interaction specifies that at least a portion of the workflow including the first operation is to be performed based on the occurrence of a particular event or condition in which the status of the computer system determined by the second operation satisfies a predetermined set of the one or more criteria;
    defining the workflow to include the first operation based on the first data indicating the user selection and to include the second operation based on the second data indicating the second user selection; and
    configuring the workflow based on the third data such that executing the workflow includes (i) monitoring a status of a particular computer system, (ii) determining, based on the monitored status of the particular computer system, whether the particular event or condition has occurred, and (iii) selectively performing the first operation based on the determination whether the particular event or condition has occurred.

2. The method of claim 1, wherein the interface for defining the workflow is a graphical user interface, an application programming interface, or a voice user interface.

3. The method of claim 1,
    wherein the first data indicates at least one of a mouse click event, a mouse double click event, a drag-and-drop event, a touch event, a touch gesture event, a voice command event, or one or more keyboard key events.

4. The method of claim 1, wherein the first and second interface elements are interactive to change a sequence in which operations in the workflow are performed; and
    wherein the method comprises:
        receiving additional data indicating a user interaction with one or more of the first and second interface elements; and
        setting or changing a sequence in which the operations of the workflow are performed based on the additional data indicating the user interaction.

5. The method of claim 1, wherein providing the interface for defining the workflow comprises providing a graphical user interface having multiple areas, wherein the multiple areas include a workflow display area configured to indicate the series of operations in the workflow.

6. The method of claim 5, comprising:
    in response to receiving the third data indicating user interaction with the one or more the third interface elements:
        generating a new interface element representing the event or condition corresponding to the one or more the third interface elements; and placing the new interface element in the workflow display area to indicate the event or condition and the effect of checking the event or condition on execution of the workflow.

7. The method of claim 5, comprising:
providing, as one of the multiple areas, a development environment area configured to receive programming code to specify one or more operations to be included in the workflow;
receiving fourth data indicating user-specified programming code entered into the development environment area;
adding, to the workflow display area, an element representing the operations of the user-specified programming code; and
configuring the workflow to execute the operations of the user-specified programming code when the workflow is executed.

8. The method of claim 7, comprising:
in response to receiving the fourth data indicating user-specified programming code, generating an interface element representing the programming code entered into the development environment area; and
placing the interface element representing the user-specified programming code in the workflow display area to indicate the inclusion of the programming code in the workflow.

9. The method of claim 5, comprising providing, as one of the multiple areas, a recording area of the multiple areas comprising controls to begin and end recording of user-initiated actions, the interface being configured to add recorded user-initiated actions as operations of the workflow.

10. The method of claim 9, comprising:
receiving data indicating a first user interaction with an interface element for initiating recording of user-initiated actions;
in response to receiving the data indicating the first user interaction, detecting a series of user interactions with the one or more computers;
receiving, through the interface, data indicating a second user interaction with an interface element for stopping the initiated recording of user-initiated actions; and
in response to receiving the data indicating the second user interaction:
generating one or more new interface elements representing the recorded user-initiated interactions; and
placing the one or more new interface elements in the workflow display area to indicate the inclusion of the recorded user-initiated actions in the workflow.

11. The method of claim 5, comprising providing, as one of the multiple areas, an application programming interface area that includes one or more interface elements specifying one or more third-party application programming interfaces.

12. The method of claim 11, comprising:
receiving data indicating an interaction with an interface element, in the application programming interface area, indicating a third-party application programming interface; and
in response to receiving the data indicating the interaction with the interface element indicating the third-party application programming interface, including an operation that uses the third-party application programming interface into the workflow.

13. The method of claim 5, comprising providing, as one of the multiple areas, a container area that includes one or more interface elements specifying one or more software images or container-related operations.

14. The method of claim 13, comprising:
receiving data indicating an interaction with an interface element, in the container area, that specifies a software image or a container-related operation; and
in response to receiving the data indicating the interaction with the interface element specifying the software image or the container-related operation:
generating a new interface element representing the software image or the container-related operation corresponding to the interface element interacted with; and
placing the new interface element in the workflow display area to indicate the inclusion in the workflow of an operation involving running the software image in a container or involving performing the container-related operation.

15. The method of claim 1, wherein the particular event or condition is a condition based on an output generated by the second operation; and
wherein configuring the workflow to selectively perform the first operation comprises configuring the workflow to selectively perform the first operation based on a determination, for each execution of the workflow, whether the output generated by the second operation during the execution of the workflow satisfies the condition based on the output of the second operation.

16. The method of claim 1, wherein the particular event or condition comprises a user-specified condition for a value to satisfy a predetermined threshold; and
wherein configuring the workflow to selectively perform the first operation comprises configuring the workflow to selectively perform the first operation based on a determination, for each execution of the workflow, whether a value generated through the execution of the workflow satisfies the predetermined threshold.

17. The method of claim 1,
wherein configuring the workflow to selectively perform the first operation comprises configuring the workflow to selectively perform the first operation based on whether status data obtained through execution of the workflow indicates the status indicated by the particular event or condition.

18. The method of claim 1, comprising:
recommending the second interface elements based on receiving the third data indicating the user interaction with the one or more of the third interface elements.

19. A system comprising:
one or more computers; and
one or more computer-readable media storing instructions that, when executed, cause the one or more computers to perform operations comprising:
providing an interface for defining a workflow, wherein the interface provides first interface elements that are selectable to cause an operation from a predetermined set of operations to be added to the workflow, wherein the interface provides second interface elements that are selectable to cause a monitoring operation to be added to the workflow, and wherein the interface provides third interface elements that are selectable to make the operations in the workflow performed selectively based on occurrence of an event or condition in which a result of the monitoring operation satisfies one or more criteria, wherein the one or more criteria include one or more predetermined sets of criteria;

receiving first data indicating a user selection, from among the first interface elements, of an interface element corresponding to a first operation in the predetermined set of operations;

receiving second data indicating a second user selection, from among the second interface elements, of a second interface element corresponding to a second operation of monitoring a status of a computer system;

receiving third data indicating user interaction with one or more of the third interface elements, wherein the user interaction specifies that at least a portion of the workflow including the first operation is to be performed based on the occurrence of a particular event or condition in which the status of the computer system determined by the second operation satisfies a predetermined set of one or more criteria;

defining the workflow to include the first operation based on the first data indicating the user selection and to include the second operation based on the second data indicating the second user selection; and configuring the workflow based on the third data such that executing the workflow includes (i) monitoring a status of a particular computer system, (ii) determining, based on the monitored status of the particular computer system, whether the particular event or condition has occurred, and (iii) selectively performing the first operation based on the determination whether the particular event or condition has occurred.

20. One or more non-transitory computer-readable media storing instructions that, when executed by one or more computers, cause the one or more computers to perform operations comprising:

providing an interface for defining a workflow, wherein the interface provides first interface elements that are selectable to cause an operation from a predetermined set of operations to be added to the workflow, wherein the interface provides second interface elements that are selectable to cause a monitoring operation to be added to the workflow, and wherein the interface provides third interface elements that are selectable to make operations in the workflow performed selectively based on occurrence of an event or condition in which a result of the monitoring operation satisfies one or more criteria, wherein the one or more criteria include one or more predetermined sets of criteria;

receiving first data indicating a user selection, from among the first interface elements, of an interface element corresponding to a first operation in the predetermined set of operations;

receiving second data indicating a second user selection, from among the second interface elements, of a second interface element corresponding to a second operation of monitoring a status of a computer system;

receiving third data indicating user interaction with one or more of the third interface elements, wherein the user interaction specifies that at least a portion of the workflow including the first operation is to be performed based on the occurrence of a particular event or condition in which the status of the computer system determined by the second operation satisfies a predetermined set of the one or more criteria;

defining the workflow to include the first operation based on the first data indicating the user selection and to include the second operation based on the second data indicating the second user selection; and configuring the workflow based on the third data such that executing the workflow includes (i) monitoring a status of a particular computer system, (ii) determining, based on the monitored status of the particular computer system, whether the particular event or condition has occurred, and (iii) selectively performing the first operation based on the determination whether the particular event or condition has occurred.

* * * * *

UNITED STATES PATENT AND TRADEMARK OFFICE
CERTIFICATE OF CORRECTION

| | | |
|---|---|---|
| PATENT NO. | : 11,966,774 B2 | Page 1 of 1 |
| APPLICATION NO. | : 17/078394 | |
| DATED | : April 23, 2024 | |
| INVENTOR(S) | : Richard Gardner, Clayton Myers and Andrew Smith | |

It is certified that error appears in the above-identified patent and that said Letters Patent is hereby corrected as shown below:

In the Claims

In Claim 5, Column 42, Line 60, after "the" delete "series of".

Signed and Sealed this
Eleventh Day of June, 2024

*Katherine Kelly Vidal*

Katherine Kelly Vidal
*Director of the United States Patent and Trademark Office*